United States Patent
Hirokubo

(10) Patent No.: US 9,389,350 B2
(45) Date of Patent: Jul. 12, 2016

(54) OPTICAL MODULE, ELECTRONIC DEVICE, FOOD ANALYZER, SPECTROSCOPIC CAMERA, DRIVING METHOD OF WAVELENGTH VARIABLE INTERFERENCE FILTER

(71) Applicant: Seiko Epson Corporation, Tokyo (JP)

(72) Inventor: Nozomu Hirokubo, Fujimi (JP)

(73) Assignee: Seiko Epson Corporation (JP)

( * ) Notice: Subject to any disclaimer, the term of this patent is extended or adjusted under 35 U.S.C. 154(b) by 157 days.

(21) Appl. No.: 13/892,856

(22) Filed: May 13, 2013

(65) Prior Publication Data
US 2013/0308134 A1    Nov. 21, 2013

(30) Foreign Application Priority Data
May 16, 2012    (JP) ................. 2012-112207

(51) Int. Cl.
G01J 3/26      (2006.01)
G02B 5/28      (2006.01)
G01J 3/45      (2006.01)
G02B 26/00     (2006.01)

(52) U.S. Cl.
CPC ... G02B 5/28 (2013.01); G01J 3/26 (2013.01); G01J 3/45 (2013.01); G02B 26/001 (2013.01)

(58) Field of Classification Search
CPC .............. G01J 3/26; G02B 5/28; G02B 5/284
USPC ......................... 356/454, 519, 506
See application file for complete search history.

(56) References Cited

U.S. PATENT DOCUMENTS

| 5,751,469 | A |    5/1998 | Arney et al. |
| 5,808,781 | A |    9/1998 | Arney et al. |
| 7,368,846 | B2 |    5/2008 | Mushika et al. |
| 7,635,939 | B2 |   12/2009 | Mushika et al. |
| 8,081,314 | B2 * | 12/2011 | Kamihara ..................... 356/454 |
| 2003/0034542 | A1 | 2/2003 | Okumura |
| 2003/0123125 | A1 | 7/2003 | Little |

(Continued)

FOREIGN PATENT DOCUMENTS

EP    2 367 035 A1    9/2011
EP    2 369 398 A1    9/2011

(Continued)

OTHER PUBLICATIONS

Extended European Search Report for Application No. EP 13 16 7619 dated Aug. 20, 2013 (11 pages).

(Continued)

Primary Examiner — Jonathan Hansen
(74) Attorney, Agent, or Firm — Harness, Dickey & Pierce, P.L.C.

(57) ABSTRACT

A optical module includes, a wavelength variable interference filter which include reflection films opposite to each other and an electrostatic actuator portion including a first electrostatic actuator and a second electrostatic actuator and changing a gap between the reflection films, and a voltage control portion which controls voltage which is applied to the electrostatic actuator portion, the voltage control portion includes, a bias driving portion which applies bias voltage to the first electrostatic actuator, a gap detector, and a feedback control portion which applies feedback voltage corresponding to a detected gap amount to the second electrostatic actuator.

16 Claims, 14 Drawing Sheets

(56) References Cited

U.S. PATENT DOCUMENTS

| | | |
|---|---|---|
| 2004/0100678 A1 | 5/2004 | Chang et al. |
| 2007/0171531 A1 | 7/2007 | Nakamura |
| 2009/0306479 A1 | 12/2009 | Kamihara |
| 2010/0004511 A1 | 1/2010 | Kamihara |
| 2010/0022840 A1 | 1/2010 | Yasuda |
| 2010/0103522 A1* | 4/2010 | Matsumoto .......... 359/578 |
| 2010/0225255 A1 | 9/2010 | Franke |
| 2011/0222157 A1 | 9/2011 | Sano |
| 2011/0222158 A1 | 9/2011 | Sano |
| 2011/0228397 A1* | 9/2011 | Matsushita .......... 359/578 |
| 2012/0200926 A1 | 8/2012 | Matsushita |
| 2012/0206813 A1* | 8/2012 | Bahat et al. .......... 359/578 |
| 2013/0279005 A1 | 10/2013 | Sano |
| 2013/0308134 A1 | 11/2013 | Hirokubo |
| 2014/0218586 A1 | 8/2014 | Sano |
| 2015/0212313 A1 | 7/2015 | Hirokubo |

FOREIGN PATENT DOCUMENTS

| | | |
|---|---|---|
| EP | 2664947 A1 | 11/2013 |
| EP | 2687832 A1 | 1/2014 |
| JP | 01-094312 | 4/1989 |
| JP | 07-243963 A | 9/1995 |
| JP | 09-236760 | 9/1997 |
| JP | 2002-277758 A | 9/2002 |
| JP | 2003-101138 | 4/2003 |
| JP | 2003-140064 A | 5/2003 |
| JP | 2003-215473 A | 7/2003 |
| JP | 2004-170899 A | 6/2004 |
| JP | 2007-086517 A | 4/2007 |
| JP | 2008-183350 A | 8/2008 |
| JP | 2011-106936 A | 6/2011 |
| JP | 2011-191492 | 9/2011 |
| JP | 2011-191554 | 9/2011 |
| JP | 2012-163664 | 8/2012 |
| JP | 2012-168362 | 9/2012 |
| JP | 2012-198268 | 10/2012 |
| JP | 2013-072930 A | 4/2013 |
| JP | 2013-088601 A | 5/2013 |
| JP | 2013-218194 A | 10/2013 |
| JP | 2013-222122 A | 10/2013 |
| JP | 2013-238755 A | 11/2013 |
| JP | 2014-059497 A | 4/2014 |
| WO | WO-02-086582 A1 | 10/2002 |
| WO | WO-2004-041710 | 5/2004 |

OTHER PUBLICATIONS

Extended European Search Report for Application No. EP 14 15 3779 dated May 6, 2014 (5 pages).

Extended Search Report for European Patent Application No. 15 15 2295 dated Jun. 18, 2015 (7 pages).

* cited by examiner

OPTICAL MODULE, ELECTRONIC DEVICE, FOOD ANALYZER, SPECTROSCOPIC CAMERA, DRIVING METHOD OF WAVELENGTH VARIABLE INTERFERENCE FILTER

BACKGROUND

1. Technical Field

The present invention relates to an optical module, an electronic device, a food analyzer, and a spectroscopic camera which include a wavelength variable interference filter, and a driving method of the wavelength variable interference filter.

2. Related Art

A known wavelength variable interference filter includes a pair of substrates that are opposite to each other, reflection films which are respectively disposed on each substrate so as to be opposite to each other, and electrodes which are respectively disposed on each substrate so as to be opposite to each other (for example, refer to JP-A-1-94312).

In the wavelength variable interference filter disclosed in JP-A-1-94312, electrodes for a capacitance monitor which are opposite to each other and electrodes for applying an electrostatic force (electrostatic actuator) which are opposite to each other are disposed on each substrate. In the wavelength variable interference filter, a gap amount (interval size) between the reflection films is changed by applying a voltage to the electrostatic actuator by a control circuit. In addition, the electric potentials of the electrodes for the capacitance monitor are detected by a capacitance detection circuit, a fine adjustment (a feedback control) is performed to the voltage, which is applied to the electrostatic actuator from the control circuit, based on the detected capacitance, and thus, the amount of the gap between the reflection films can be set to a desired target value.

Incidentally, in the wavelength variable interference filter disclosed in JP-A-1-94312, the amount of the gap between the reflection films is controlled by applying the voltage to the electrostatic actuator by the control circuit.

However, in the electrostatic actuator, a displacement amount (sensitivity) of an interelectrode gap with respect to the applied voltage is nonlinearly changed according to the amount of the interelectrode gap. Therefore, even when a gain of the control circuit which controls the voltage of the electrostatic actuator is optimally set to the sensitivity of a certain interelectrode gap, if the interelectrode gap is greatly changed, the sensitivity of the electrostatic actuator is different, and thus, a suitable control cannot be performed. That is, there is a problem in that the control circuit functions according to the gain in which the interelectrode gap is set to only the case of the limited narrow range.

On the other hand, a configuration is also considered in which the gain of the control circuit is changed according to the amount of the interelectrode gap and the control circuit optimally functions with respect to a wider gap range. However, in this case, there is a problem that the system for realizing the variable gain is complicated.

SUMMARY

An advantage of some aspects of the invention is to provide an optical module, an electronic device, a food analyzer, a spectroscopic camera, and a driving method of a wavelength variable interference filter capable of accurately realizing a fine adjustment of a gap amount with respect to a wide gap range of a gap between reflection films by a simple configuration.

An aspect of the invention is directed to an optical module including: a wavelength variable interference filter which includes two reflection films opposite to each other across a gap between the reflection films and an electrostatic actuator portion which changes an amount of the gap between the reflection films by applying a voltage; and a voltage control portion which controls voltage which is applied to the electrostatic actuator portion, wherein the electrostatic actuator portion includes a first electrostatic actuator and a second electrostatic actuator which can be driven independently of each other, and the voltage control portion includes: a bias voltage applying unit which applies a preset bias voltage to the first electrostatic actuator; a gap detection unit which detects the amount of the gap between the reflection films; and a feedback voltage applying unit which applies feedback voltage corresponding to the gap amount which is detected by the gap detection unit to the second electrostatic actuator.

According to the aspect of the invention, the electrostatic actuator portion which changes the gap between the reflection films is provided in the wavelength variable interference filter, and the electrostatic actuator portion includes the first electrostatic actuator and the second electrostatic actuator which can be driven independently of each other.

In addition, the bias voltage applying unit of the voltage control portion applies the bias voltage to the first electrostatic actuator. Moreover, the feedback voltage applying unit applies the feedback voltage to the second electrostatic actuator so that the gap (detected gap) between the reflection films detected by the gap detection unit is a target gap amount of the gap between the reflection films.

Here, the bias voltage becomes the voltage which is preset according to a wavelength of the light extracted by the wavelength variable interference filter, that is, according to the target gap amount of the gap between the reflection films. Moreover, in this case, the gap between the reflection films is set to the target gap amount by applying the bias voltage and the feedback voltage. Therefore, the bias voltage of this case becomes a voltage which is smaller than the drive voltage of the first electrostatic actuator when the gap between the reflection films is set to the target gap amount by driving only the first electrostatic actuator.

Generally, a smaller gap between the reflection films results in a larger sensitivity (a displacement amount of an interelectrode gap with respect to applied voltage) of the electrostatic actuator. Therefore, when an analog controller, in which gain is constant, is used as a voltage controller which applies the feedback voltage, a gap range which can accurately adjust the gap between the reflection films becomes narrow since the gap range is limited to a range which can be adjusted to a constant gain. Moreover, when a digital controller is used as the voltage controller which applies the feedback voltage, since an appropriate gain can be easily set according to a sensitivity change of the electrostatic actuator by signal processing, a circuit which changes the gain is not necessary. However, a smaller interelectrode gap also results in a higher sensitivity of the electrostatic actuator, and thus, it is necessary to set a more minute voltage value by a D/A converter. Thereby, a bit number of the D/A converter increases, and thus, the costs increase.

On the other hand, in the aspect of the invention, since the bias voltage is applied to the first electrostatic actuator, the sensitivity when the feedback voltage is applied to the second electrostatic actuator by the feedback voltage applying unit can be decreased, and fine adjustment of the gap amount at the time of the feedback control can be easily performed. Thereby, in a state where the gain in the feedback voltage applying unit is fixed so as to be constant, the fine adjustment of a highly accurate gap amount can be performed with respect to a wide gap range. Moreover, since the configuration which changes the gain is not necessary in the feedback voltage applying unit, simplification of the configuration can be achieved.

Moreover, even in the configuration in which a digital controller is used as the feedback voltage applying unit and voltage is applied to the second electrostatic actuator, since the bit number in the D/A converter can be decreased, low costs can be achieved.

In the optical module according to the aspect of the invention, it is preferable that the bias voltage applying unit applies bias voltage, in which the feedback voltage to displace the gap between the reflection films to a predetermined gap amount becomes a predetermined voltage value, to the first electrostatic actuator.

In this configuration, when the feedback voltage is applied to the second electrostatic actuator by the feedback voltage applying unit, the bias voltage is applied so that the feedback voltage to displace the gap between the reflection films by a predetermined unit gap amount is a constant predetermined voltage value regardless of the amount of the gap between the reflection films. That is, when the feedback control is performed by the feedback voltage applying unit, the bias voltage is applied to the first electrostatic actuator so that the sensitivity is constant.

Thereby, the feedback control can be performed by constant sensitivity regardless of the amount of the gap between the reflection films. Therefore, the setting of the feedback voltage at the time of the feedback control is easily performed, and a more highly accurate feedback control can be performed.

In the optical module according to the aspect of the invention, it is preferable that the wavelength variable interference filter includes: a first substrate on which one of two reflection films is provided; and a second substrate which is provided so as to be opposite to the first substrate and on which the other one of two reflection films is provided, the first electrostatic actuator preferably includes: a first electrode which is provided on the first substrate; and a second electrode which is provided on the second substrate and is opposite to the first electrode across a gap, the second electrostatic actuator preferably includes: a third electrode which is provided on the first substrate; and a fourth electrode which is provided on the second substrate and is opposite to the third electrode across a gap, and when a spring coefficient of the second substrate is k, permittivity of the gap is $\varepsilon$, an area of a region in which the first electrode and the second electrode are overlapped with each other in a plan view when viewed from the thickness directions of the substrates of the first substrate and the second substrate is $S_b$, an area of a region in which the third electrode and the fourth electrode are overlapped with each other in the plan view is $S_c$, an initial gap amount, which is the amount of the gap in a state where voltage is not applied to the first electrostatic actuator and the second electrostatic actuator, is $d_{max}$, a displacement amount from the initial gap amount of the gap to extract light of a target wavelength by the wavelength variable interference filter is d, and sensitivity of the second electrostatic actuator to displace the gap by a predetermined amount is $R_c$, the bias voltage applying unit preferably applies a bias voltage $V_b$, which satisfies the following Equation (1), to the first electrostatic actuator.

$$V_b = \left[ \frac{k}{\varepsilon S_b} \left\{ 2d(d_{max} - d)^2 - \frac{kR_c^2(d_{max} - d)^2(d_{max} - 3d)^2}{\varepsilon S_c} \right\} \right]^{1/2} \quad (1)$$

For example, as the setting of the bias voltage, the bias voltage is measured in advance with respect to the target gap amount for extracting the light of the target wavelength from the wavelength variable interference filter, and the bias voltage with respect to the gap amount may be stored in a storage unit such as a memory as table data. However, in this case, when the set width of the target gap amount which can be set is a wide range, the data amount is increased, and thus, it is considered that a large capacity of memory is needed to store the data.

On the other hand, in the configuration described above, since the bias voltage is set based on Equation (1), the above-described problems can be avoided, and a large capacity of memory is not needed, and thus, simplification of the configuration is achieved. Moreover, based on Equation (1), correct bias voltage can be easily set with respect to the sensitivity of the second electrostatic actuator to be set.

In the optical module according to the aspect of the invention, it is preferable that the feedback voltage applying unit applies analog voltage to the second electrostatic actuator.

In this configuration, the feedback voltage applying unit applies analog voltage as the feedback voltage to the second electrostatic actuator. Here, the analog voltage described in this case is voltage which is output by an analog controller having a constant gain.

When the analog voltage is applied, the gain for controlling the voltage value is needed. However, in this case, as described above, in the state where the gain is fixed, fine adjustment of the gap between the reflection films by a highly accurate feedback control can be performed with respect to a wide gap range. Moreover, the configuration which changes the gain is not needed, and thus, low costs can be achieved.

In the optical module according to the aspect of the invention, it is preferable that the feedback voltage applying unit applies digital voltage to the second electrostatic actuator.

In this configuration, the feedback voltage applying unit applies digital voltage as the feedback voltage to the second electrostatic actuator. Here, for example, the digital voltage described in this case is voltage which is output from a digital controller having a D/A converter or the like which converts digital signals to analog voltage.

With this configuration, as described above, since the bias voltage is applied to the first electrostatic actuator, the sensitivity of the second electrostatic actuator can be decreased, and thus, voltage resolution of the feedback voltage which is applied to the second electrostatic actuator can be decreased. Thereby, the bit number in the D/A converter can be decreased, and thus, low costs can be achieved.

In the optical module according to the aspect of the invention, it is preferable that the wavelength variable interference filter includes: a first substrate which is provided on one of two reflection films; a second substrate which is provided so as to be opposite to the first substrate and provided on the other one of two reflection films; a first capacitance detection electrode which is provided on the first substrate; and a second capacitance detection electrode which is provided on the second substrate and is opposite to the first capacitance detection electrode across a gap, and the gap detection unit preferably detects the amount of the gap between reflection films based on an electric charge which is held in the first capacitance detection electrode and the second capacitance detection electrode.

In this configuration, the gap detection unit detects the electric charge which is held in the first capacitance detection electrode provided on the first substrate and the second capacitance detection electrode provided on the second substrate, and thus, the gap detection unit detects the amount of the gap between the reflection films.

In this configuration, by a simple configuration in which only electrodes opposite to each other are provided between each substrate, the amount of the gap between the reflection films can be easily detected.

In the optical module according to the aspect of the invention, it is preferable that the first capacitance detection electrode is one of the two reflection films, and the second capacitance detection electrode is preferably the other one of the two reflection films.

In this configuration, one of two reflection films functions as the first capacitance detection electrode and the other functions as the second capacitance detection electrode. In this case, for example, it is not necessary to provide an electrode for configuring the separate first capacitance detection electrode and second capacitance detection electrode other than the reflection film or the electrostatic actuator portion, and thus, simplification of the configuration is achieved. Moreover, since the gap between the reflection films is detected by the capacitance between two reflection films, for example, compared to a case where the capacitance detection electrode is provided at a position away from the reflection film of the first substrate or the second substrate, a more accurate gap between the reflection films can be detected.

In the optical module according to the aspect of the invention, it is preferable that the second electrostatic actuator is positioned at a position further away from the first capacitance detection electrode and the second capacitance detection electrode than the first electrostatic actuator in a plan view when the wavelength variable interference filter is viewed from the thickness direction of the reflection film.

In this configuration, the second electrostatic actuator to which the feedback voltage is applied is positioned at the position further away from the first capacitance detection electrode and the second capacitance detection electrode than the first electrostatic actuator to which the bias voltage is applied. For example, like this case, when the two reflection films opposite to each other are the first capacitance detection electrode and the second capacitance detection electrode, the first electrostatic actuator is disposed outside the refection films, and the second electrostatic actuator is disposed further outside of the first electrostatic actuator.

The feedback voltage which is applied to the second electrostatic actuator may include high frequency components. Therefore, when the second electrostatic actuator is disposed near the first capacitance detection electrode or the second capacitance detection electrode, crosstalk may occur, and thus, there is a concern that gap detection accuracy may be decreased due to the gap detection unit. On the other hand, in this case, since the second electrostatic actuator is disposed at the position away from the first capacitance detection electrode or the second capacitance detection electrode, the influence of the crosstalk can be suppressed, and a decrease of the gap detection accuracy due to the gap detection unit can be suppressed.

In the optical module according to the aspect of the invention, it is preferable that the first capacitance detection electrode and the second capacitance detection electrode are electrodes which configure at least one of the first electrostatic actuator and the second electrostatic actuator of the electrostatic actuator portion.

In this configuration, the electrode (first electrode and second electrode) which configures the first electrostatic actuator or the electrode (third electrode and fourth electrode) which configures the second electrostatic actuator function as the first capacitance electrode and the second capacitance detection electrode. Also in this case, compared to the configuration in which where the separate first capacitance detection electrode and second capacitance detection electrode other than the reflection film or the electrostatic actuator portion are provided, simplification of the configuration is achieved.

In the optical module according to the aspect of the invention, it is preferable that the first electrostatic actuator includes at least two or more partial actuators which can be driven independently of each other.

In this configuration, the first electrostatic actuator includes two or more partial actuators. Therefore, for example, when the first electrostatic actuator is divided into two partial actuators, control can be performed in which the bias voltage is applied to one partial actuator and the feedback voltage based on the gap amount detected by the gap detection unit is applied to other partial actuator. Moreover, in a configuration which includes three or more partial actuators, after the bias voltage is applied to one partial actuator, the feedback voltage is applied to the other partial actuator, and thereafter, the feedback voltage can be further applied to the remaining partial actuator.

In above-described each configuration, even when voltage change due to noise or the like occurs in the first electrostatic actuator, the gap change can be suppressed by controlling the feedback voltage which is applied to the second electrostatic actuator. However, if the noise is increased, the control of the feedback voltage with respect to the second electrostatic actuator is not fully performed, and thus, it is also considered that the amount of the gap between the reflection films is slightly changed. On the other hand, in this case, the first electrostatic actuator is divided into a plurality of partial actuators, the influence of the noise can be decreased by controlling the bias voltage and the feedback voltage as described above, and thus, a more highly accurate voltage control in which the change of the gap amount is suppressed can be performed.

In addition, when the voltage output from a D/A converter is applied to the first electrostatic actuator, since the first electrostatic actuator is divided into the plurality of partial actuators, the voltage resolution of the D/A converter can be decreased. Therefore, the bit number of the D/A converter can be decreased, and thus, low costs of the optical module can be achieved.

Another aspect of the invention is directed to an electronic device including: a wavelength variable interference filter which includes two reflection films opposite to each other across a gap between the reflection films and an electrostatic actuator portion which changes an amount of the gap between the reflection films by applying a voltage; and a voltage control portion which controls voltage which is applied to the electrostatic actuator portion, wherein the electrostatic actuator portion includes a first electrostatic actuator and a second electrostatic actuator, and the voltage control portion includes: a bias voltage applying unit which applies preset bias voltage to the first electrostatic actuator; a gap detection unit which detects the amount of the gap between the reflection films; and a feedback voltage applying unit which applies feedback voltage corresponding to the gap amount which is detected by the gap detection unit to the second electrostatic actuator.

In this configuration, since the bias voltage is applied to the first electrostatic actuator by the bias voltage applying unit, the sensitivity at the time of the voltage applying when the feedback voltage is applied by the feedback voltage applying unit can be decreased. Thereby, the fine adjustment of a highly accurate gap amount can be performed with respect to a wide gap range. Therefore, the light of the target wavelength can be extracted from the wavelength variable interference filter with high accuracy, and various processing can be performed with higher accuracy based on the extracted light in the electronic device.

Moreover, as the feedback voltage applying unit, the configuration which changes the gain, the D/A converter having a large bit number, or the like is not needed, simplification of the configuration and low costs can be achieved. Therefore, costs in the electronic device can be also decreased.

Still another aspect of the invention is directed to a food analyzer including: a wavelength variable interference filter which includes two reflection films opposite to each other across a gap between the reflection films and an electrostatic actuator portion which changes an amount of the gap between the reflection films by applying a voltage; a voltage control portion which controls voltage which is applied to the electrostatic actuator portion; a detection portion which detects light extracted by the wavelength variable interference filter; a storage portion which stores information related to a spectrum of a component of food; and an analyzing portion which calculates a spectrum from the light detected by the detection portion and performs a component analysis of the food based on the information stored in the storage portion, wherein the voltage control portion includes: a bias voltage applying unit which applies preset bias voltage to the first electrostatic actuator; a gap detection unit which detects the amount of the gap between the reflection films; and a feedback voltage applying unit which applies feedback voltage corresponding to the gap amount which is detected by the gap detection unit to the second electrostatic actuator.

In this configuration, similar to the above-described aspects, since the bias voltage is applied to the first electrostatic actuator by the bias voltage applying unit, the change of the sensitivity at the time of the voltage applying when the feedback voltage is applied by the feedback voltage applying unit can be decreased. Thereby, the fine adjustment of a highly accurate gap amount can be performed with respect to a wide gap range.

Therefore, the light of the wavelength corresponding to the component to be analyzed of food can be extracted from the wavelength variable interference filter with high accuracy, and the component analysis of the food can be performed with high accuracy by the analyzing portion.

Moreover, as the feedback voltage applying unit, the configuration which changes the gain, the D/A converter having a large bit number, or the like is not needed, simplification of the configuration and low costs in a food analyzer can be achieved.

Yet another aspect of the invention is directed to a spectroscopic camera including: a wavelength variable interference filter which includes two reflection films opposite to each other across a gap between the reflection films and an electrostatic actuator portion which changes an amount of the gap between the reflection films by applying a voltage; a voltage control portion which controls voltage which is applied to the electrostatic actuator portion; an imaging portion which images light transmitting the wavelength variable interference filter; and a plurality of lenses which guide image light of an object to be measured to the imaging portion through the wavelength variable interference filter, wherein the voltage control portion includes: a bias voltage applying unit which applies preset bias voltage to the first electrostatic actuator; a gap detection unit which detects the amount of the gap between the reflection films; and a feedback voltage applying unit which applies feedback voltage corresponding to the gap amount which is detected by the gap detection unit to the second electrostatic actuator.

In this configuration, similar to the above-described aspects, since the bias voltage is applied to the first electrostatic actuator by the bias voltage applying unit, the change of the sensitivity at the time of the voltage applying when the feedback voltage is applied by the feedback voltage applying unit can be decreased. Thereby, fine adjustment of a highly accurate gap amount can be performed with respect to a wide gap range.

Therefore, the light (spectroscopic image light) of the desired wavelength can be accurately extracted from the light (image light) incident to the wavelength variable interference filter through the plurality of lenses, and a correct spectroscopic image can be imaged with respect to a desired wavelength in the imaging portion.

Moreover, as the feedback voltage applying unit, the configuration which change the gain, the D/A converter having a large bit number, or the like is not needed to use, simplification of the configuration and low costs in the spectroscopic camera can be achieved.

Still yet another aspect of the invention is directed to a driving method of a wavelength variable interference filter which includes two reflection films opposite to each other across a gap between the reflection films and an electrostatic actuator portion which changes an amount of the gap between the reflection films by applying a voltage, in which the electrostatic actuator portion includes a first electrostatic actuator and a second electrostatic actuator, wherein the driving method of a wavelength variable interference filter includes: applying preset bias voltage to the first electrostatic actuator; detecting the amount of the gap between the reflection films; and applying feedback voltage corresponding to the gap amount which is detected by the detecting gap to the second electrostatic actuator.

In this configuration, in the state where the bias voltage is applied to the first electrostatic actuator by the applying the bias voltage, the detecting of the amount of the gap between the reflection films is performed, and the feedback voltage corresponding to the gap amount detected by the detecting is applied to the second electrostatic actuator by the applying the feedback voltage. Thereby, in the application of the feedback voltage, the change of the sensitivity at the time of the voltage applying can be decreased. Thereby, the fine adjustment of a highly accurate gap amount can be performed with respect to a wide gap range, and the light of the target wavelength can be accurately extracted from the wavelength variable interference filter.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment according to the invention will be described with reference to the drawings.

Configuration of Spectroscopic Measurement Device

Figure 1:
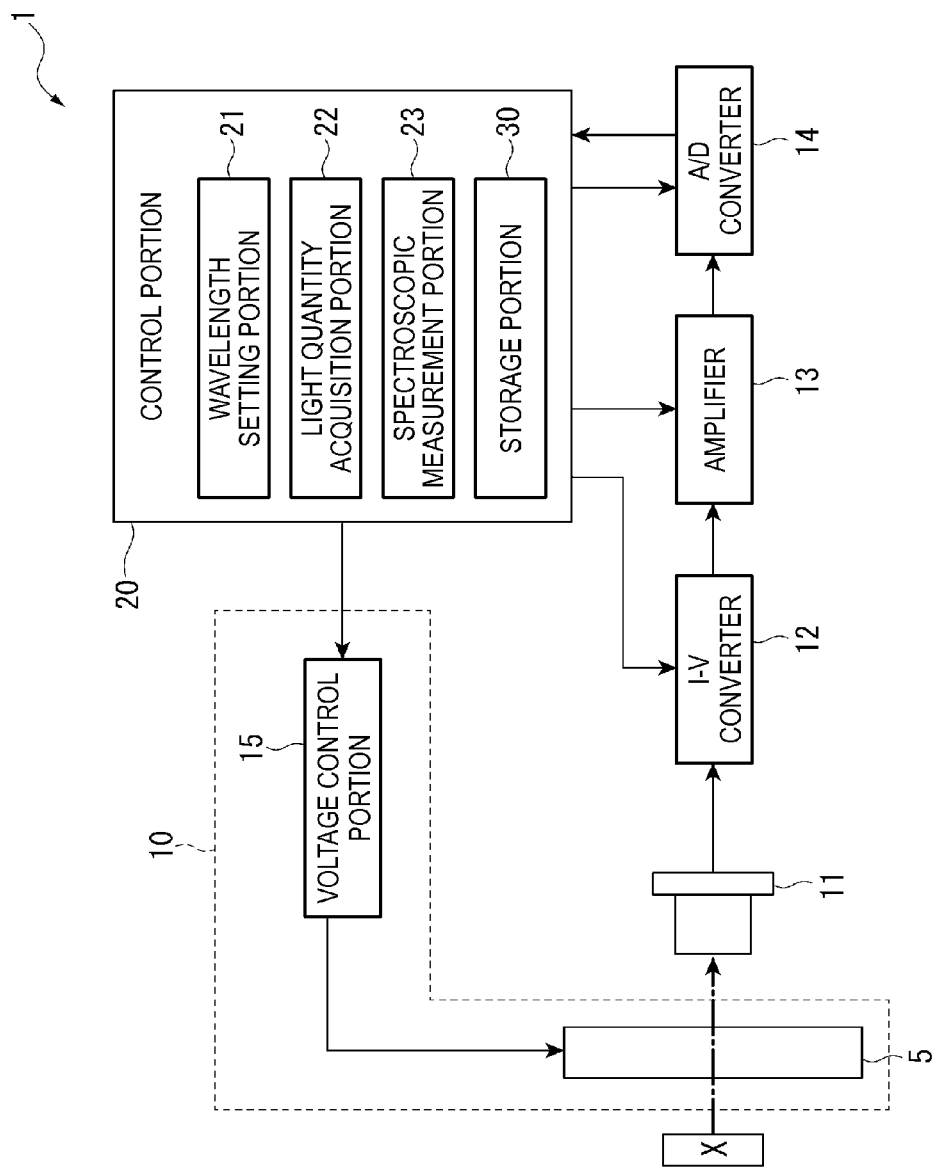
FIG. 1 is a block diagram showing a schematic configuration of a spectroscopic measurement device of a first embodiment according to the invention.

FIG. 1 is a block diagram showing a schematic configuration of a spectroscopic measurement device of the first embodiment according to the invention.

A spectroscopic measurement device 1 is an example of an electronic device of the invention, and is a device which analyzes light intensity having a predetermined wavelength in light to be measured which is reflected by an object to be measured X and measures an optical spectrum. Moreover, in the embodiment, the example is described in which the light to be measured which is reflected by the object to be measured X is measured. However, for example, when a light-emitting body such as a liquid crystal panel is used as the object to be measured X, the light which is emitted from the light-emitting body may be the light to be measured.

As shown in FIG. 1, the spectroscopic measurement device 1 includes an optical module 10, a detector 11 (detection portion), an I-V converter 12, an amplifier 13, an A/D converter 14, and a control portion 20. Moreover, the optical module is configured so as to include a wavelength variable interference filter 5 and a voltage control portion 15.

The detector 11 receives light which transmits through the wavelength variable interference filter 5 of the optical module 10 and outputs detection signals (current) corresponding to the light intensity of the received light.

The I-V converter 12 converts the detection signals input from the detector 11 to a voltage value and outputs the voltage value to the amplifier 13.

The amplifier 13 amplifies the voltage (detection voltage) corresponding to the detection signals which are input from the I-V converter 12.

The A/D converter 14 converts the detection voltage (analog signals), which is input from the amplifier 13, to digital signals and outputs the digital signals to the control portion 20.

The voltage control portion 15 drives the wavelength variable interference filter 5 based on the control of the control portion 20 and transmits light having a predetermined target wavelength from the wavelength variable interference filter 5.

Configuration of Optical Module

Next, a configuration of the optical module 10 will be described below.

Figure 2:
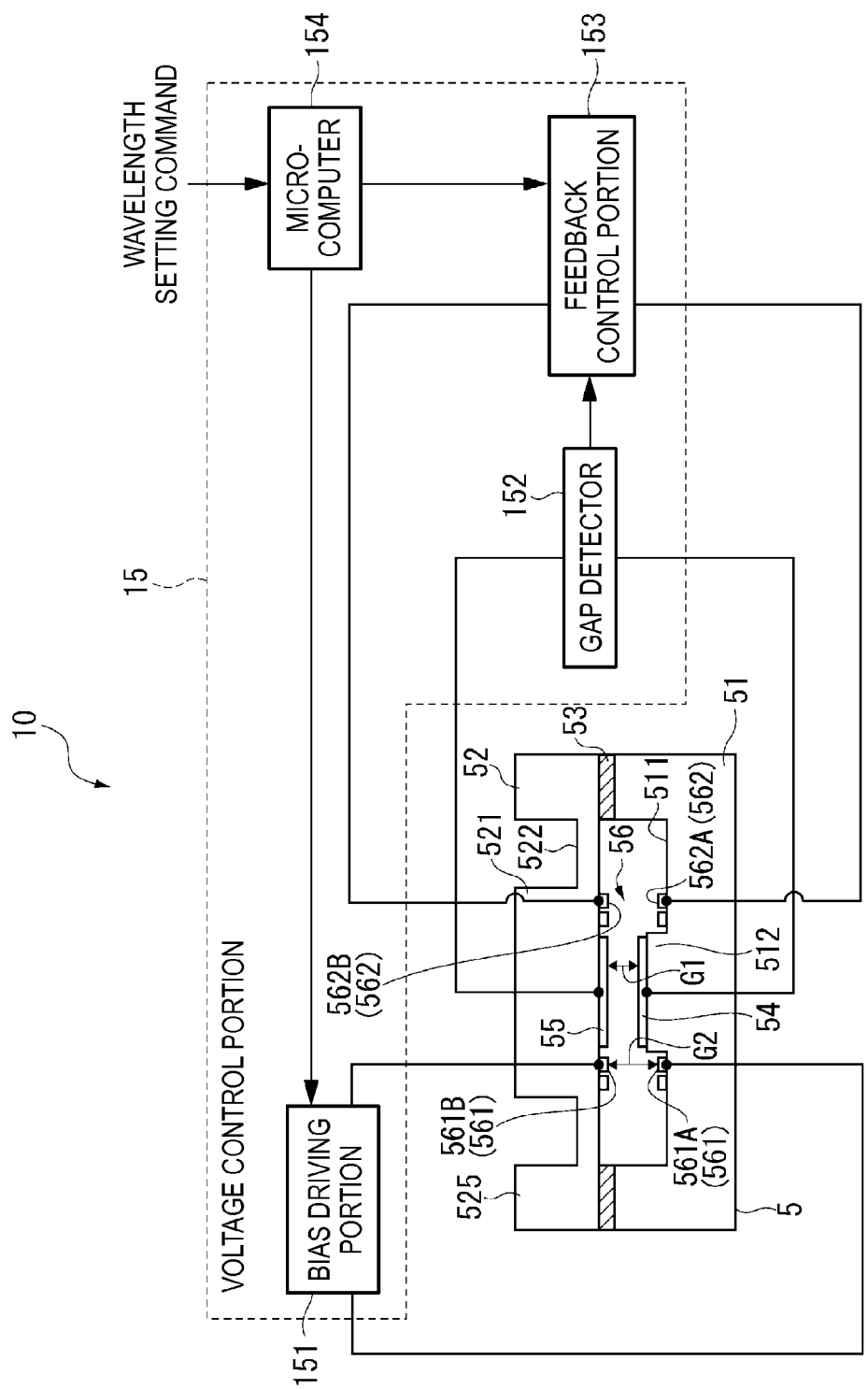
FIG. 2 is a block diagram showing a schematic configuration of an optical module of the first embodiment.

FIG. 2 is a block diagram showing a schematic configuration of the optical module 10.

As described above, the optical module 10 is configured so as to include the wavelength variable interference filter 5 and the voltage control portion 15.

Configuration of Wavelength Variable Interference Filter

Figure 3:
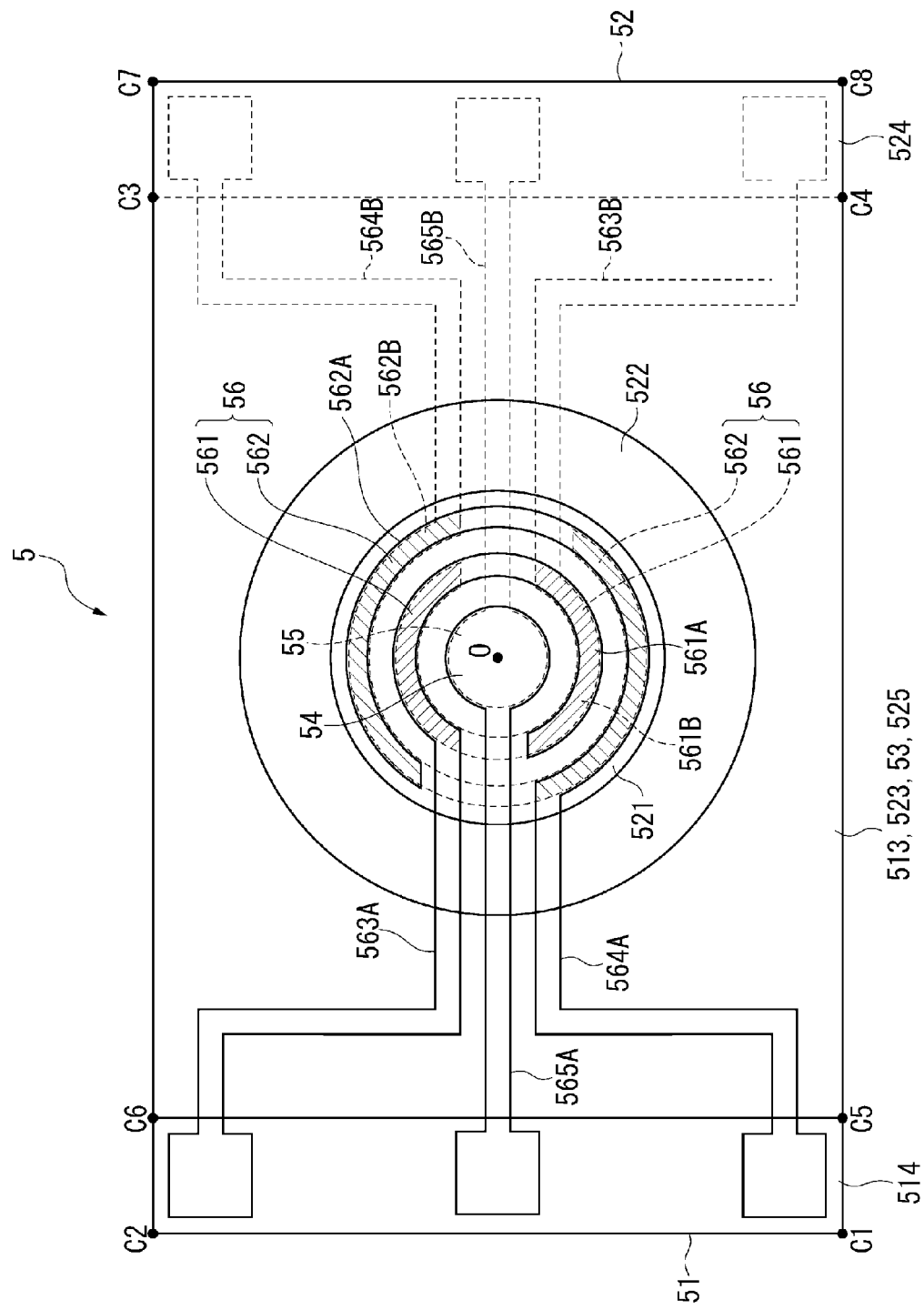
FIG. 3 is a plan view showing a schematic configuration of a wavelength variable interference filter of the first embodiment.
Figure 4:
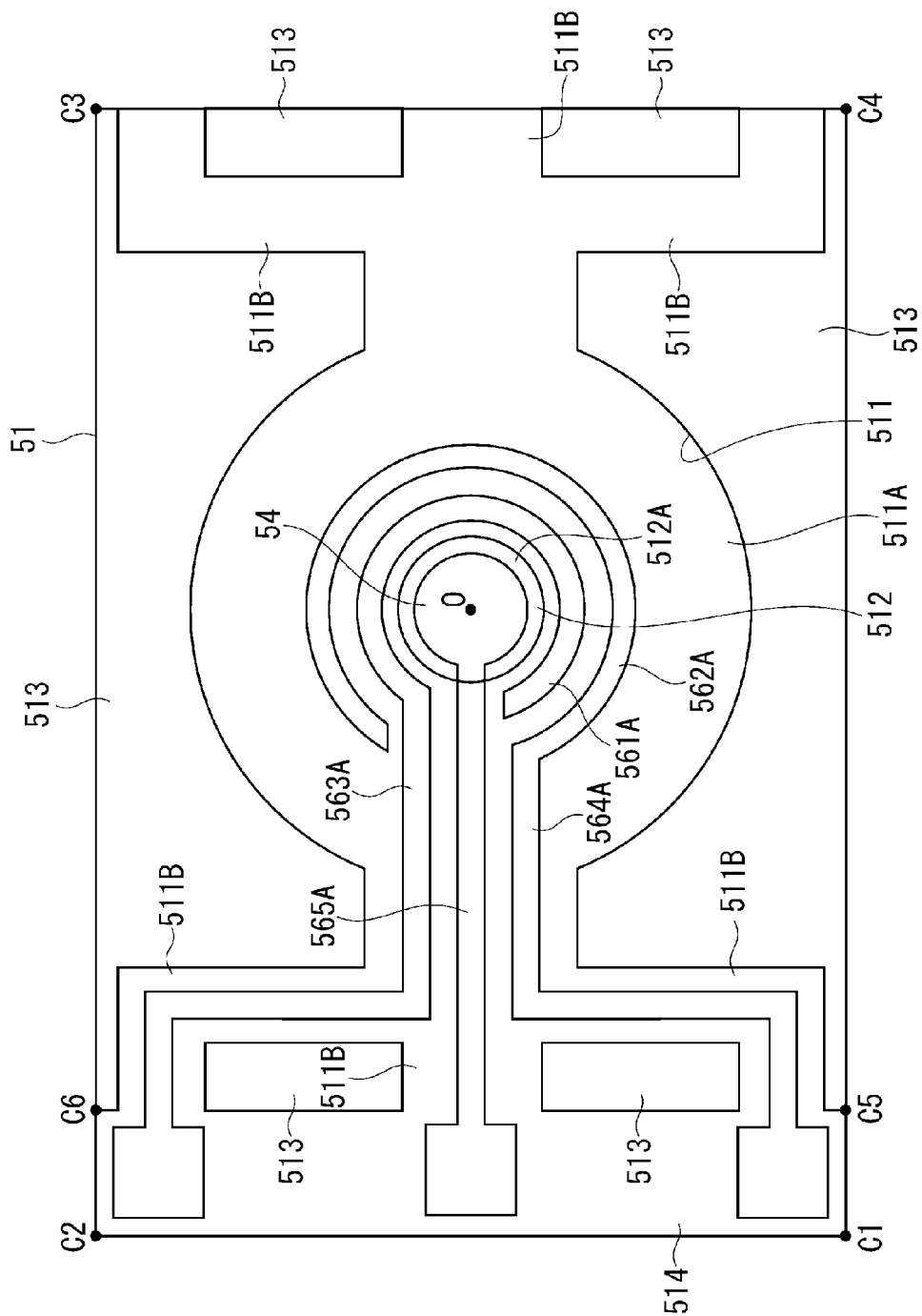
FIG. 4 is a plan view when a fixed substrate is viewed from a movable substrate side in the first embodiment.
Figure 5:
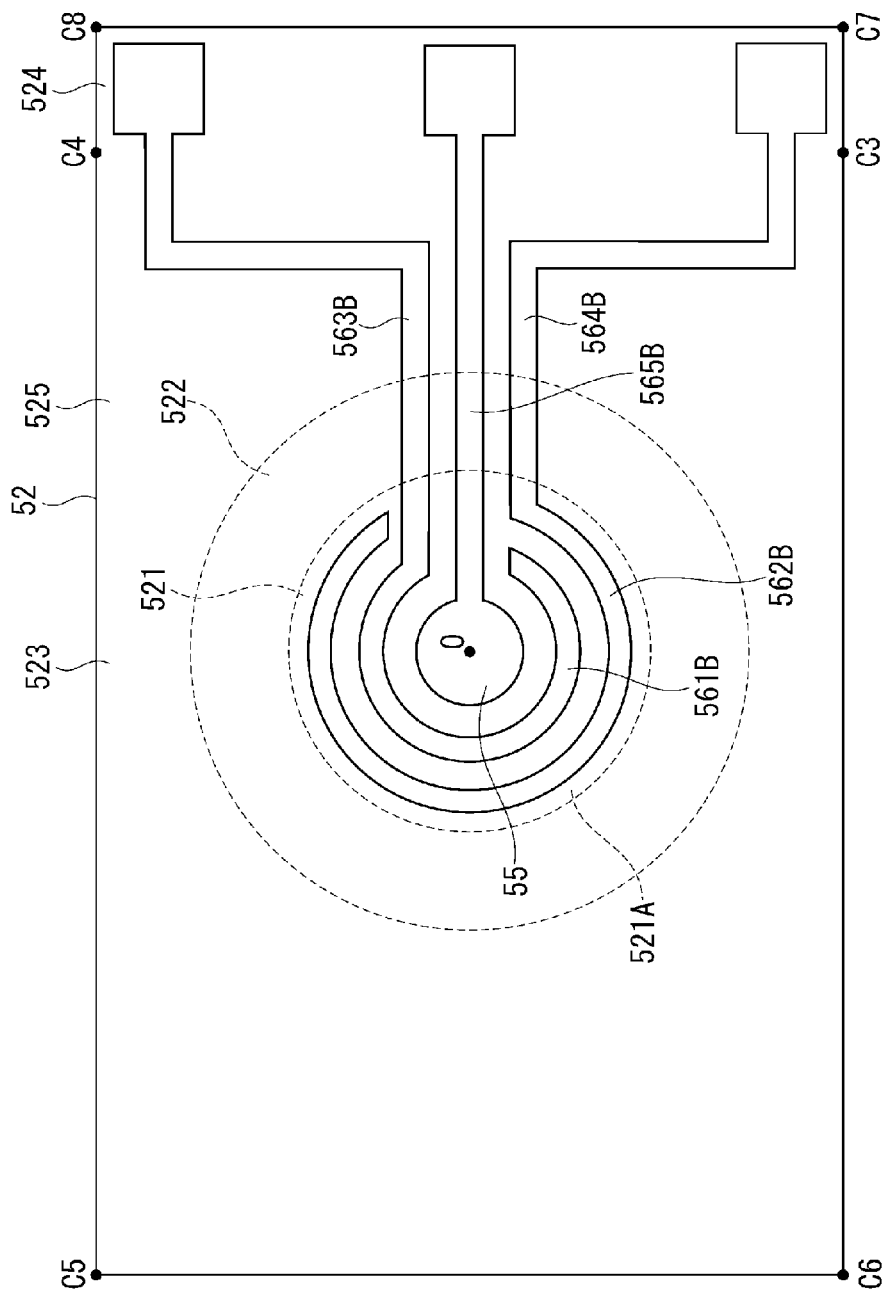
FIG. 5 is a plan view when the movable substrate is viewed from the fixed substrate side in the first embodiment.

The wavelength variable interference filter 5 of the optical module 10 will be described below. FIG. 3 is a plan view showing a schematic configuration of the wavelength variable interference filter 5. FIG. 4 is a plan view when a fixed substrate 51 is viewed from a movable substrate 52 side. FIG. 5 is a plan view when the movable substrate 52 is viewed from the fixed substrate 51 side. Moreover, in FIG. 3, films (a fixed reflection film 54, a first electrode 561A, a third electrode 562A, a first lead-out electrode 563A, a third lead-out electrode 564A, and a fifth lead-out electrode 565A), which are provided on the fixed substrate 51, are shown by solid lines, and films (a movable reflection film 55, a second electrode 561B, a fourth electrode 562B, a second lead-out electrode 563B, a fourth lead-out electrode 564B, and a sixth lead-out electrode 565B), which are provided on the movable substrate 52, are shown by broken lines.

As shown in FIG. 3, for example, the wavelength variable interference filter 5 is a rectangular plate-shaped optical member and includes the fixed substrate 51 and the movable substrate 52. The fixed substrate 51 and the movable substrate 52 each are formed of various glass, crystal, or the like, and for example, a first joint portion 513 of the fixed substrate 51 and a second joint portion 523 of the movable substrate are joined to each other by a joint film 53 (refer to FIG. 2) which is configured of a plasma polymerized film or the like having siloxane as a main component, and thus, the fixed substrate and the movable substrate are integrally configured.

The fixed reflection film 54 which configures one reflection film according to the invention is provided on the fixed substrate 51, and the movable reflection film 55 which configures the other reflection film according to the invention is provided on the movable substrate 52. The fixed reflection film 54 and the movable reflection film 55 are disposed so as to be opposite to each other across a gap G1 between the reflection films (refer to FIG. 2). In addition, an electrostatic actuator portion 56 which is used for adjusting (changing) the amount of the gap G1 between the reflection films is provided in the wavelength variable interference filter 5. The electrostatic actuator portion 56 includes a first electrostatic actuator 561 and a second electrostatic actuator 562 which can be independently driven respectively.

Moreover, in the descriptions below, a plan view when the wavelength variable interference filter 5 is viewed from the thickness direction of the substrate of the fixed substrate 51 or the movable substrate 52, that is, a plan view when the wavelength variable interference filter 5 is viewed from the lamination direction of the fixed substrate 51, the joint film 53, and the movable substrate 52 is referred to as a plan view of the filter. Moreover, in the embodiment, in the plan view of the filter, a center point of the fixed reflection film 54 and a center point of the movable reflection film 55 coincide with each other, the center points of the reflection films in a plan view are referred to as a filter center point O, and a straight line which passes through the center points of the reflection films is referred to as a center axis.

Configuration of Fixed Substrate

The fixed substrate 51 is formed so that the thickness size is larger than that of the movable substrate 52, and the fixed substrate 51 is not bent due to electrostatic attraction by the electrostatic actuator portion 56 or an internal stress of a film member (for example, fixed reflection film 54 or the like) which is formed on the fixed substrate 51.

As shown in FIG. 4, for example, the fixed substrate includes an electrode disposition groove 511 and a reflection film installation portion 512 which are formed by etching or the like. Moreover, one end side (a side C1-C2 in FIGS. 3 and 4) of the fixed substrate 51 protrudes outside from the end edge (a side C5-C6 in FIGS. 3 and 4) of the movable substrate 52, and configures a fixed side terminal extraction portion 514.

In the plan view of the filter, the electrode disposition groove 511 is formed in an annular shape about the filter center point O of the fixed substrate 51. In the plan view of the filer, the reflection film installation portion 512 is formed so as to protrude the movable substrate 52 side from the center portion of the electrode disposition groove 511. The bottom surface of the electrode disposition groove 511 becomes an electrode installation surface 511A on which the electrode of the electrostatic actuator portion 56 is disposed. In addition, the protruded tip surface of the reflection film installation portion 512 becomes a reflection film installation surface 512A.

Moreover, an electrode lead-out groove 511B, which extends from the electrode disposition groove 511 toward the outer circumferential edge of the fixed substrate 51, is provided on the fixed substrate 51. Specifically, the electrode lead-out groove 511B includes three electrode lead-out grooves 511B which face the side C3-C4, and three electrode lead-out grooves 511B which face the side C1-C2 and are connected to the fixed side terminal extraction portion 514.

The first electrode 561A which configures the first electrostatic actuator 561 and the third electrode 562A which configures the second electrostatic actuator 562 are provided on the electrode installation surface 511A of the electrode disposition groove 511. More specifically, the first electrode 561A and the third electrode 562A are provided on a region opposite of a movable portion 521 described below in the electrode installation surface 511A. Moreover, the first electrode 561A is provided at the outer circumference side of the reflection film installation portion 512 and the inner circumference side of the third electrode 562A, and the third electrode 562A is provided at the outer circumference side of the first electrode 561A. The first electrode 561A and the third electrode 562A each are formed in an arc shape (approximately C shape), and a C shaped opening portion is provided in a portion which approaches the side C1-C2. Moreover, an insulating film may be configured so as to be laminated on the first electrode 561A and the third electrode 562A in order to secure insulation between the second electrode 561B and the fourth electrode 562B.

In addition, as shown in FIG. 4, in the fixed substrate 51, the first lead-out electrode 563A which extends from one end of the first electrode 561A toward an apex C2 is provided, and a third lead-out electrode 564A which extends from one end of the third electrode 562A toward an apex C1 is provided. The first lead-out electrode 563A is disposed along the electrode lead-out groove 511B which extends toward the apex C2, and extends up to the apex C2 on the fixed side terminal extraction portion 514. Moreover, the third lead-out electrode 564A is disposed along the electrode lead-out groove 511B which extends toward the apex C1, and extends up to the apex C1 on the fixed side terminal extraction portion 514. In addition, for example, the extended tip portions of the first lead-out electrode 563A and the third lead-out electrode 564A are connected to the voltage control portion 15 by flexible printed circuits (FPC), lead wires, or the like.

As described above, the reflection film installation portion 512 is formed in an approximately columnar shape, which has a smaller diameter than the electrode disposition groove 511, on the same axis as the electrode disposition groove 511, and includes the reflection film installation surface 512A of the reflection film installation portion 512 opposite to the movable substrate 52.

As shown in FIG. 4, the fixed reflection film 54 is installed on the reflection film installation portion 512. For example, as the fixed reflection film 54, a metal film such as Ag or a conductive alloy film such as Ag alloy may be used. In addition, for example, a dielectric multilayer in which a high refraction layer is $TiO_2$ and a low refraction layer is $SiO_2$ may be used, and in this case, it is preferable that a conductive metal alloy film be formed on the lowest layer or the outermost layer of the dielectric multilayer.

Moreover, in the FIG. 4, the fifth lead-out electrode 565A which extends from the outer circumference edge of the fixed reflection film 54 is provided on the fixed substrate 51. For example, the fifth lead-out electrode 565A passes between the first lead-out electrode 563A and the third lead-out electrode 564A, is disposed along the electrode lead-out groove 511B which extends toward the center point of the side C1-C2, and extends up to the position of the center point of the side C1-C2 on the fixed side terminal extraction portion 514. In addition, for example, similar to the first lead-out electrode 563A and the fourth lead-out electrode 564B, the extended tip portion of the fifth lead-out electrode 565A is connected to the voltage control portion 15 by the FPC, the lead wires, or the like.

Moreover, an antireflection film may be formed at a position corresponding to the fixed reflection film 54 on a light incident surface (a surface on which the fixed reflection film 54 is not provided) of the fixed substrate 51. The antireflection film may be formed by alternately laminating a low refractive index film and a high refractive index film, decreases reflectivity of visible light on the surface of the fixed substrate 51, and increases the transmissivity.

Moreover, in the surface of the fixed substrate 51 opposite to the movable surface 52, the surfaces, on which the electrode disposition groove 511, the reflection film installation portion 512, and the electrode lead-out groove 511B are not formed, configure the first joint portion 513. The first joint portion 513 is joined to the second joint portion 523 of the movable substrate 52 by the joint film 53.

Configuration of Movable Substrate

In the plan view of the filter as shown in FIG. 3, the movable substrate 52 includes a circular movable portion 521 which has the filter center point O as the center, a holding portion 522 which has the same axis as the movable portion 521 and holds the movable portion 521, and a substrate outer circumferential portion 525 which is provided outside the holding portion 522.

Moreover, in movable substrate 52, as shown in FIG. 3, one end side (a side C7-C8 in FIGS. 3 and 5) protrudes outside from the end edge (the side C3-C4 in FIGS. 3 and 4) of the fixed substrate 51, and configures a movable side terminal extraction portion 524.

The movable portion 521 is formed so that the thickness size is larger than the holding portion 522, and for example, in the embodiment, the movable portion 521 is formed so as to be the same size as the thickness size of the movable substrate 52. In the plan view of the filter, the movable portion 521 is formed so as to be at least a larger diameter size than the diameter size of the outer circumference edge of the reflection film installation surface 512A. Moreover, in the movable portion 521, the movable reflection film 55, the second electrode 561B which configures the first electrostatic actuator 561, and the fourth electrode 562B which configures the second electrostatic actuator 562 are provided.

Moreover, similar to the fixed substrate 51, an antireflection film may be formed on a surface of the side opposite to the fixed substrate 51 of the movable portion 521.

The second electrode 561B is provided on the outer circumference side of the movable reflection film 55, and the fourth electrode 562B is provided on the outer circumference side of the second electrode 561B. The second electrode 561B and the fourth electrode 562B each are formed in an arc shape (approximately C shape), and a C shaped opening portion is provided in a portion which approaches the side C7-C8. Here, in the plan view of the filter, the second electrode 561B includes an arc region which overlaps with the first electrode 561A, and the first electrostatic actuator 561 is configured by the arc region. Similarly, the fourth electrode 562B includes an arc region which overlaps with the second electrode 561B, and the second electrostatic actuator 562 is configured by the arc region.

Moreover, similar to the first electrode 561A and the third electrode 562A, an insulating film for securing insulation may be configured so as to be overlapped on the second electrode 561B and the fourth electrode 562B.

In addition, as shown in FIG. 5, in the movable substrate 52, the second lead-out electrode 563B which extends from one end of the second electrode 561B toward an apex C8 is provided, and a fourth lead-out electrode 564B which extends from one end of the fourth electrode 562B toward an apex C7 is provided. The second lead-out electrode 563B is disposed at a position which is opposite to the electrode lead-out groove 511B extending toward an apex C4 provided on the fixed substrate 51, and extends up to the apex C8 on the movable side terminal extraction portion 524. Moreover, the fourth lead-out electrode 564B is disposed at a position which is opposite to the electrode lead-out groove 511B which extends toward the apex C3, and extends up to the apex C7 on the movable side terminal extraction portion 524. In addition, for example, the extended tip portions of the second lead-out electrode 563B and the fourth lead-out electrode 564B are connected to the voltage control portion 15 by the FPC, lead wires, or the like.

The movable reflection film 55 is provided so as to be opposite to the fixed reflection film 54 across the gap G1 between reflection films at the center portion of a movable surface 521A of the movable portion 521. As the movable reflection film 55, a reflection film having the same configuration as the above-described fixed reflection film 54 is preferably used.

Moreover, as shown in FIG. 5, the sixth lead-out electrode 565B which extends from the outer circumference edge of the movable reflection film 55 is provided on the movable substrate 52. For example, the sixth lead-out electrode 565B passes between the second lead-out electrode 563B and the fourth lead-out electrode 564B, is disposed at a position opposite to the electrode lead-out groove 511B which extends toward the middle point of the side C3-C4 of the fixed substrate 51, and extends up to the position of the middle point of the side C7-C8 on the movable side terminal extraction portion 524. In addition, for example, similar to the second lead-out electrode 563B and the fourth lead-out electrode 564B, the extended tip portion of the sixth lead-out electrode 565B is connected to the voltage control portion 15 by the FPC, the lead wires, or the like.

Moreover, in the embodiment, as described above, the example is described in which the amount of an interelectrode gap G2 (refer to FIG. 2) is larger than the amount of the gap G1 between the reflection films. However, the invention is not limited to this. For example, when infrared rays or far infrared rays are used as the light to be measured, or the like, according to the wavelength region of the light to be measured, the amount of the gap G1 between the reflection films may be configured so as to be larger than the amount of the interelectrode gap G2.

The holding portion 522 is a diaphragm which surrounds around the movable portion 521, and is formed so that the thickness size is smaller than that of the movable portion 521. The holding portion 522 is more easily bent than the movable portion 521, and the movable portion 521 can be displaced to the fixed substrate 51 side by slight electrostatic attraction. At this time, since the thickness size of the movable portion 521 is larger than that of the holding portion 522 and the stiffness of the movable portion 521 is increased, even when the holding portion 522 is pulled to the fixed substrate 51 side by the electrostatic attraction, a shape change of the movable portion 521 does not occur. Therefore, bending of the movable reflection film 55 provided in the movable portion 521 does not occur, and the fixed reflection film 54 and the movable reflection film 55 can be always maintained to a parallel state.

Moreover, in the embodiment, the holding portion 522 having a diaphragm shape is exemplified. However, the invention is not limited this, and for example, a configuration in which beam shaped holding portions disposed at equal angular intervals while having the filter center point O as the center are provided, or the like may be adopted.

As described above, the substrate outer circumference portion 525 is provided outside the holding portion 522 in the plan view of the filter. The second joint portion 523 opposite to the first joint portion 513 is provided on the surface of the substrate outer circumference portion 525 opposite to the fixed substrate 51, and the second joint portion 523 is joined to the first joint portion 513 via the joint film 53.

Configuration of Voltage Control Portion

As shown in FIG. 2, the voltage control portion 15 is configured so as to include a bias driving portion 151 (bias voltage applying unit), a gap detector 152 (gap detection unit), a feedback control portion 153 (feedback voltage applying unit), and a microcomputer (microcontroller) 154.

The bias driving portion 151 is connected to the first lead-out electrode 563A and the second lead-out electrode 563B of the wavelength variable interference filter 5, and applies bias voltage with respect to the first electrostatic actuator 561. Specifically, the bias driving portion 151 is configured by a D/A converter having a predetermined bit number, and applies voltage to the first electrostatic actuator 561 based on bias signals which are input from the microcomputer 154.

The gap detector 152 is connected to the fifth lead-out electrode 565A and the sixth lead-out electrode 565B of the wavelength variable interference filter 5, and acquires detection signals corresponding to the amount of the gap G1 between the reflection films. Moreover, the gap detector 152 outputs the acquired detection signals to the feedback control portion 153.

The feedback control portion 153 is connected to the third lead-out electrode 564A and the fourth lead-out electrode 564B of the wavelength variable interference filter 5, and applies feedback voltage with respect to the second electrostatic actuator 562. At this time, the feedback portion 153 applies feedback voltage with respect to the second electrostatic actuator 562 so that the detection signals input from the gap detector 152 and a target value (target detection signals) input from the microcomputer 154 are the same value as each other.

Moreover, the feedback control portion 153 of the embodiment is configured by an analog controller having a fixed gain, and the voltage variable range is set to a predetermined width. For example, the analog controller can be incorporated by a more simple system configuration than an analog controller having a variable gain, and thus, low costs can be achieved. Here, for example, as the analog controller, a PI controller, a PID controller, or the like can be used. Moreover, other controllers may be used.

The microcomputer 154 is connected to the control portion 20, the bias driving portion 151, the gap detector 152, and the feedback control portion 153. Moreover, the microcomputer 154 includes a storage unit (not shown) which is configured by a memory or the like. For example, in the storage unit, gap correlation data which is the detection signals (voltage signals) detected by the gap detector 152 with respect to the amount of the gap G1 between the reflection films is stored.

Moreover, the microcomputer 154 controls the bias driving portion 151, the gap detector 152, and the feedback control portion 153 based on the control signals which are input from the control portion 20, and thus, transmits the light of the target wavelength from the wavelength variable interference filter 5.

Moreover, the detail descriptions with respect to the control of the drive voltage of the wavelength variable interference filter 5 by the voltage control portion 15 will be described below.

Configuration of Control Portion

Returning to FIG. 1, the control portion 20 of the spectroscopic measurement device 1 will be described.

The control portion 20 corresponds to a processing portion according to the invention, is configured by combining a CPU, a memory, or the like, for example, and controls the entire operation of the spectroscopic measurement device 1. As shown FIG. 1, the control portion 20 includes a wavelength setting portion 21, a light quantity acquisition portion 22, and a spectroscopic measurement portion 23.

The wavelength setting portion 21 sets the target wavelength of the light which is extracted by the wavelength variable interference filter 5, and output control signals of an intent, which extracts the set target wavelength from the wavelength variable interference filter 5, to the voltage control portion 15.

The light quantity acquisition portion 22 acquires the light quantity of the light of the target wavelength which transmits the wavelength variable interference filter 5, based on the light quantity which is acquired by the detector 11.

The spectroscopic measurement portion 23 measures spectral characteristics of the light to be measured based on the light quantity which is acquired by the light quantity acquisition portion 22.

Driving Method of Wavelength Variable Interference Filter

Figure 6:
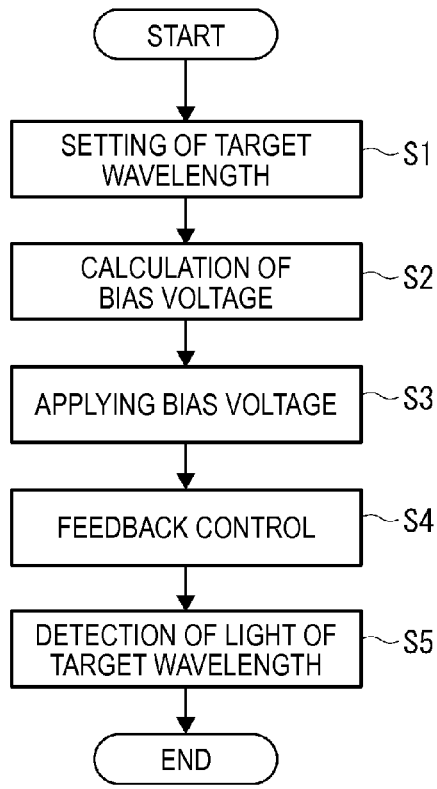
FIG. 6 is a flowchart showing a driving method of the wavelength variable interference filter in a spectroscopic measuring process of a spectroscopic measurement device of the first embodiment.

FIG. 6 is a flowchart showing a driving method (driving processing) of the wavelength variable interference filter in an electroscopic measuring process of the spectroscopic measurement device 1.

In order to acquire the intensity of the light of each wavelength which is included in the light to be measured by the spectroscopic measurement device 1, first, the control portion 20 sets the wavelength (target wavelength) of the light, which transmits the wavelength variable interference filter 5, by the wavelength setting portion 21. Moreover, the wavelength setting portion 21 outputs control signals of an intent, which transmit the light of the set target wavelength, to the voltage control portion 15 (S1).

If the control signals are input from the control portion 20, the microcomputer 154 of the voltage control portion 15 calculates bias voltage corresponding to the target wavelength (S2).

Here, in the embodiment, the microcomputer 154 sets the bias voltage so that sensitivity (a gap displacement amount with respect to the applied voltage (m/V)) at the time of applying voltage to the second electrostatic actuator 562 is constant in a feedback control described below.

Here, the sensitivity $R_c$ (m/V) at the time of applying voltage to the second electrostatic actuator 562 is represented by the following Equation (2).

$$R_C = \frac{\{2k\varepsilon S_C d(d_{max} - d)^2 - \varepsilon^2 S_C S_b V_b^2\}^{1/2}}{k(d_{max} - d)(d_{max} - 3d)} \qquad (2)$$

Figure 7:
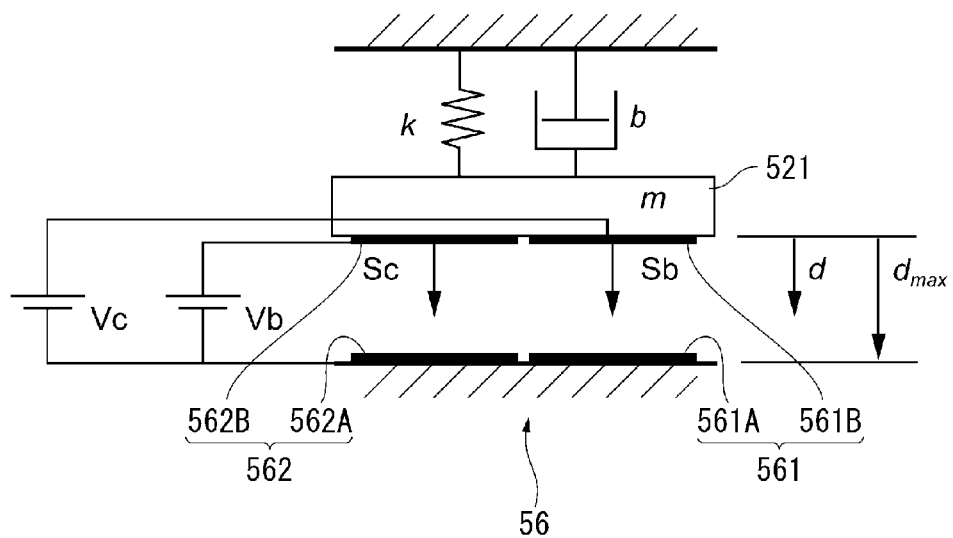
FIG. 7 is a view showing an equivalent circuit model of an electrostatic actuator portion in the first embodiment.

FIG. 7 is a view for illustrating the above-described Equation (2), and shows an equivalent circuit model of the electrostatic actuator portion 56.

In FIG. 7 and Equation (2), $V_b$ is bias voltage which is applied to the first electrostatic actuator 561, k is a spring coefficient of the movable substrate 52 (holding portion 522), $\varepsilon$ is permittivity between the fixed substrate 51 and the movable substrate 52 (interelectrode gap G2), $S_b$ is an area of a region (a region which functions as the first electrostatic actuator 561) in which the first electrode 561A and the second electrode 561B are overlapped with each other in the plan view of the filter, $S_c$ is an area of a region (a region which functions as the second electrostatic actuator 562) in which the third electrode 562A and the fourth electrode 562B are overlapped with each other in the plan view of the filter, $d_{max}$ is an initial gap amount (gap amount in a state where voltage is not applied) of the interelectrode gap G2, and d is a displacement amount (displacement amount of interelectrode gap G2) of the movable portion 521 for transmitting the light of the target wavelength. Moreover, in FIG. 7, b is a damping coefficient.

In the embodiment, when the feedback control is performed, the bias voltage $V_b$ is applied so that the sensitivity at the time of applying voltage to the second electrostatic actuator 562 is constant. That is, in Equation (2), $R_c$ is a constant value, and a value, which is preset according to the fixed gain in the analog controller of the feedback control portion 153, is preferably used. Moreover, if the control signals which designate the target wavelength are input from the control portion 20, the microcomputer 154 can calculate a target gap amount of the gap G1 between the reflection films for extracting the light of the target wavelength from wavelength variable interference filter 5 and can calculate the amount (target displacement amount d) to displace the movable portion 521 from the target gap amount.

When Equation (2) is solved with respect to $V_b$, the above-described Equation (1) can be derived. Therefore, in the S2, the microcomputer 154 calculates the applied voltage (bias voltage) to the first electrostatic actuator 561 for driving the second electrostatic actuator 562 at a predetermined sensitivity in the feedback control, based on Equation (1).

Moreover, the microcomputer 154 outputs bias signals based on the bias voltage which are calculated by the S2 to the bias driving portion 151. Thereby, the bias driving portion 151 applies the bias voltage calculated by the S2 to the first electrostatic actuator 561 (S3: bias voltage applying step). According to the S3, electrostatic attraction based on the bias voltage is generated between the first electrode 561A and the second electrode 561B, and the movable portion 521 is displaced to the fixed substrate 51 side.

Figure 8A:
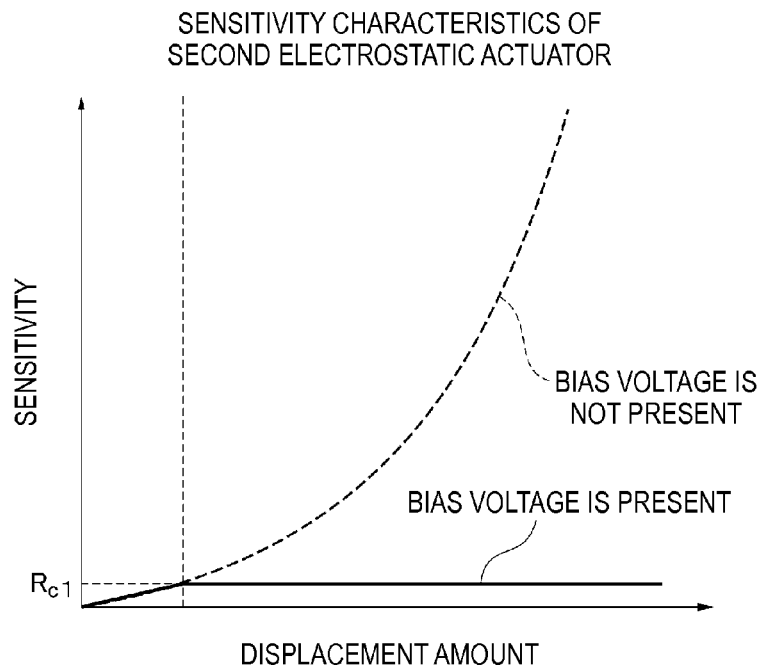
FIGS. 8A and 8B are views illustrating sensitivity of a second electrostatic actuator at the time of a feedback control.
Figure 8B:
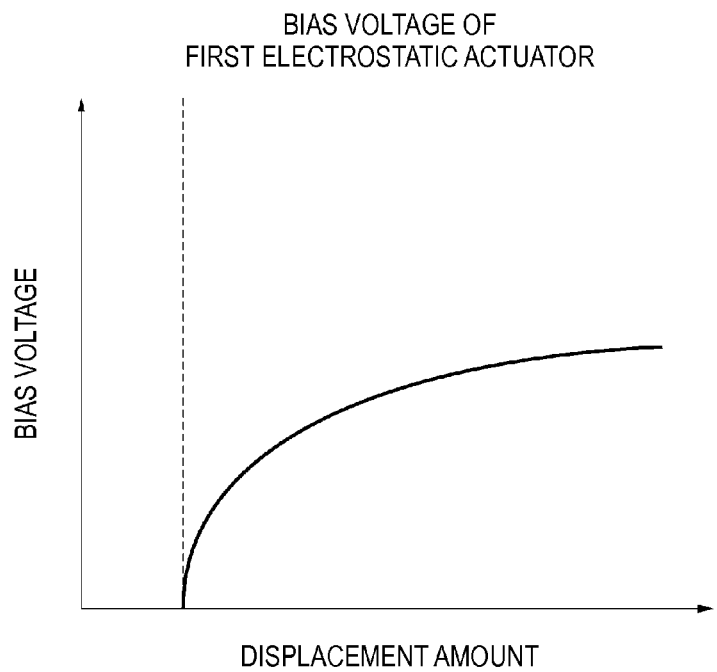

Here, FIGS. 8A and 8B are views for illustrating the sensitivity of the second electrostatic actuator 562 when the bias voltage applied to the first electrostatic actuator 561 is applied at the time of the feedback control.

As shown by a broken line in FIG. 8A, in the sensitivity of the second electrostatic actuator 562 which applies the feedback voltage, in a state where the bias voltage is not applied to the first electrostatic actuator 561, the sensitivity is largely changed with respect to the displacement amount, and the sensitivity is increased according to the increase of the displacement amount. In this way, when the sensitivity of the electrostatic actuator which applies the feedback voltage is changed, even though the gain of the analog controller is set in accordance with certain sensitivity, the sensitivity is largely different in a location where the displacement amount is different, and the analog controller does not function appropriately. That is, in the state where the bias voltage is not applied, the analog controller appropriately functions only in the vicinity of the gap which sets the gain.

In the embodiment, as shown in FIG. 8B, since the bias voltage based on Equation (1) is applied to the first electrostatic actuator 561, as shown by a solid line in FIG. 8A, the sensitivity of the second electrostatic actuator 562 becomes a constant such as a desired sensitivity $R_{C1}$.

Moreover, in the embodiment, the example is described in which the bias voltage is applied so that the sensitivity $R_c$ is constant. However, the value of the bias voltage is not limited to the value based on Equation (1), and the bias voltage may be applied so that desired sensitivity characteristics are obtained.

Thereafter, the feedback control is performed by the feedback control portion 153 (S4). The feedback control (S4) includes a gap detection step and a feedback voltage applying step according to the invention.

That is, the microcomputer 154 applies high frequency voltage for detecting capacitance to the fixed reflection film 54 and the movable reflection film 55 from the gap detector 152. Thereby, the detection signals corresponding to the capacitance of the fixed reflection film 54 and the movable reflection film 55 can be acquired by the gap detector 152, and the acquired detection signals are output to the feedback control portion 153 (gap detection step).

In addition, the microcomputer 154 calculates the target gap amount corresponding to the target wavelength based on the control signals from the control portion 20, acquires the detection signals (target detection signals) corresponding to the target gap amount from the gap correlation data which is stored in the storage unit, and outputs the acquired signals to the feedback control portion 153.

In addition, the feedback control portion 153 calculates differences between the target detection signals input from the microcomputer 154 and the detection signals input from the gap detector 152, and applies the feedback voltage to the second electrostatic actuator 562 so that the differences are "0" (feedback voltage applying step).

Figure 9:
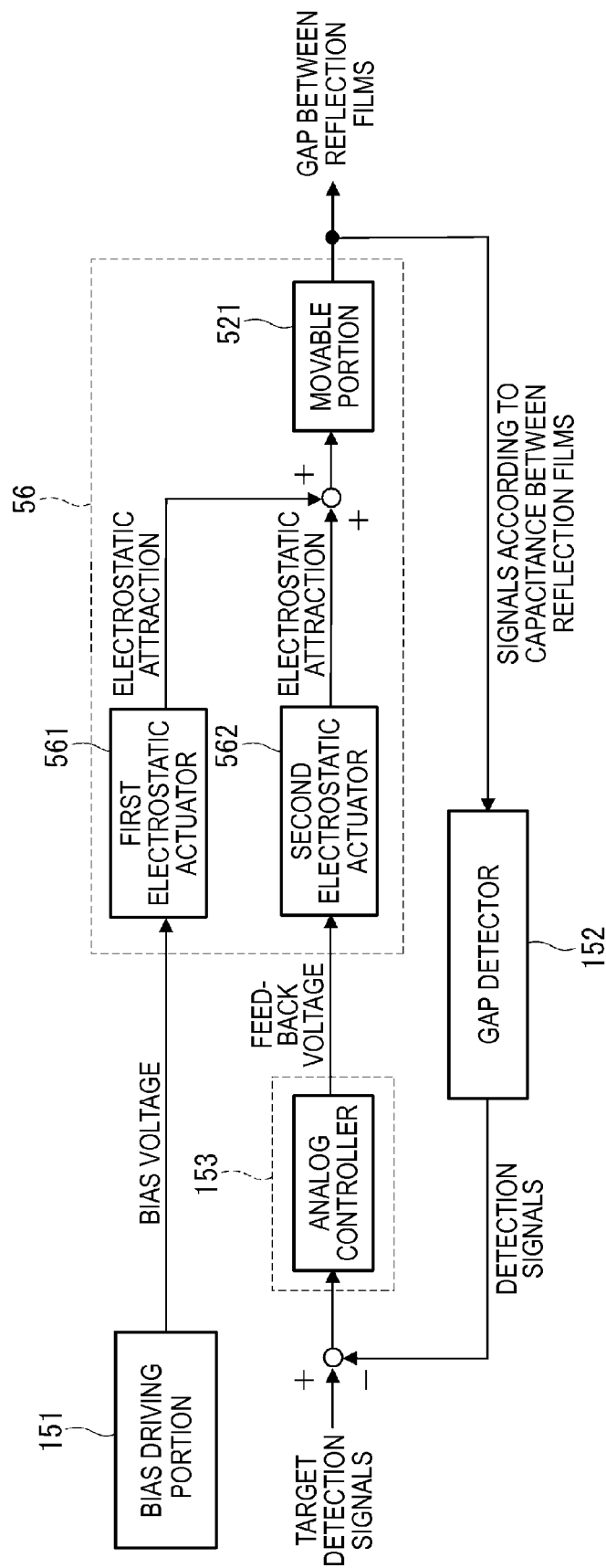
FIG. 9 is a conceptual view of the feedback control of the embodiment.

Here, FIG. 9 is a conceptual view of the feedback control.

As shown in FIG. 9, the bias driving portion 151 applies the bias voltage, which causes the sensitivity of the second electrostatic actuator 562 to be constant as shown in FIGS. 8A and 8B, to the first electrostatic actuator 561.

Therefore, in the feedback voltage applying step, based on a deviation between the target value signals input from the microcomputer 154 and the signals output from the gap detector, the analog controller of the feedback voltage applying portion 153 may set the feedback voltage, which is applied to the second electrostatic actuator 562, so that the deviation is 0.

In this case, regardless of the displacement amount (variation of the interelectrode gap G2) of the movable portion 521, it is possible to drive the second electrostatic actuator 562 at low sensitivity.

Moreover, after the S4, the light which transmits the wavelength variable interference filter 5 is detected by the detector 11 (S5), and the light quantity of the light having the transmitted wavelength is acquired by the wavelength setting portion 21 of the control portion 20.

Moreover, in the above, the light of one wavelength is extracted from the wavelength variable interference filter 5, and the process which detects the light quantity is described. However, for example, when the optical spectrum of the light to be measured is measured from the light quantities with respect to each wavelength in the predetermined wavelength region which is included in the light to be measured, the wavelength set in the S1 is sequentially changed, and the processes of S2 to S5 may be repeated.

Effects of the Embodiment

The optical module 10 of the spectroscopic measurement device 1 of the embodiment includes the wavelength variable interference filter 5 and the voltage control portion 15. The wavelength variable interference filter 5 includes the electrostatic actuator portion 56 for changing the gap G1 between reflection films between the fixed reflection film 54 and the movable reflection film 55, and the electrostatic actuator portion 56 includes the first electrostatic actuator 561 and the second electrostatic actuator 562. Moreover, the voltage control portion 15 includes the bias driving portion 151, the gap detector 152, the feedback control portion 153, and the microcomputer 154. Moreover, the microcomputer 154 outputs the bias signals to the bias driving portion 151 based on the control signals (target wavelength) input from the control portion 20, and outputs the target detection signals corresponding to the target wavelength to the feedback control portion 153. Thereby, the bias driving portion 151 applies the bias voltage to the first electrostatic actuator 561 and moves the movable portion 521 up to the vicinity of the target displacement amount. Moreover, the feedback control portion 153 applies the feedback voltage to the second electrostatic actuator 562 so that the differences between the detection signals from the gap detector 152 and the target detection signals are "0".

In the configuration, when the feedback voltage is applied to the second electrostatic actuator 562 by the feedback control portion 153 and a fine adjustment is performed to the amount of the gap G1 between the reflection films, the sensitivity of the second electrostatic actuator 562 can be decreased. That is, regardless of the target gap amount of the gap G1 between the reflection films, the sensitivity of the second electrostatic actuator 562 can be decreased. Therefore, in a state where the gain of the analog controller of the feedback control portion 153 is fixed to a constant gain, the fine adjustment of a highly accurate gap amount can be performed by the feedback control with respect to the wide gap range of the gap G1 between the reflection films. Moreover, as the feedback control portion 153, an analog controller having a variable gain which requires a complicated system configuration is not needed, and thus, simplification of the configuration and low costs can be achieved.

In the optical module 10 of the embodiment, the bias driving portion 151 applies the bias voltage based on Equation (1) to the first electrostatic actuator 561. Thereby, regardless of the amount of the gap G1 between reflection films, the sensitivity of the second electrostatics actuator 562 in the feedback control can be constant. Therefore, the setting of the feedback voltage in the feedback control portion 153 can be easily performed, and a more highly accurate feedback control can be carried out.

Moreover, the microcomputer 154 calculates the bias voltage based on Equation (1) and outputs the bias signals to the bias driving portion 151. Thereby, for example, compared to a case where the bias voltage with respect to the target gap amount of the gap G1 between the reflection films is stored as table data, a more accurate bias voltage can be set, a large storage region for holding the data is not needed, and thus, low costs can be achieved.

In the embodiment, the feedback control portion 153 includes the analog controller, and the analog voltage is applied to the second electrostatic actuator 562 as the feedback voltage. Here, in the embodiment, as described above, since the sensitivity of the second electrostatic actuator 562 can be constant by applying the bias voltage to the first electrostatic actuator 561, the gain of the analog controller can be fixed to one, and thus, simplification of the configuration of the feedback control portion 153 can be achieved.

In the wavelength variable interference filter 5 of the embodiment, the fixed reflection film 54 and the movable reflection film 55 function as a first capacitance detection electrode and a second capacitance detection electrode according to the invention, and the feedback control portion 153 detects the detection signals based on the amount of the gap G1 between the reflection films on the basis of the capacitance between the fixed reflection film 54 and the movable reflection film 55.

In the configuration, the amount of the gap G1 between the reflection films can be easily detected by the fixed reflection film 54 and the movable reflection film 55 which are provided on the fixed substrate 51 and the movable substrate 52, and thus, simplification of the configuration of the wavelength variable interference filter 5 can be achieved. In addition, in order to detect capacitance between the fixed reflection film 54 and the movable reflection film 55, a separate (dedicated) electrode only for detecting the capacitance is not needed. Also from this point, simplification of the configuration of the wavelength variable interference filter 5 can be achieved.

In the embodiment, the first electrode 561A and the second electrode 561B which configure the first electrostatic actuator 561 are provided at the outer circumference sides of the fixed reflection film 54 and the movable reflection film 55 respectively. Moreover, the third electrode 562A and the fourth electrode 562B which configure the second electrostatic actuator 562 are provided outside from the first electrode 561A and the second electrode 561B respectively.

That is, the second electrostatic actuator 562, to which the feedback voltage is applied, which may include high frequency components, is disposed at the position away from the fixed reflection film 54 and the movable reflection film 55 for detecting the amount of the gap G1 between the reflection films. Thereby, crosstalk from the second electrostatic actuator 562 to the fixed reflection film 54 and the movable reflection film 55 can be suppressed, and thus, the amount of the gap G1 between reflection films can be accurately detected in the gap detector 152.

Second Embodiment

In the first embodiment, the feedback control portion 153 which includes the analog controller having a fixed gain is exemplified. On the other hand, a second embodiment is different from the first embodiment in that the feedback control portion 153 applies voltage (digital voltage in the embodiment) output by a digital controller to the second electrostatic actuator 562.

Moreover, since the second embodiment includes the similar configurations as the first embodiment, the feedback control portion 153 of the second embodiment will be described below with reference to FIG. 1, and descriptions of other configurations are omitted.

The feedback control portion 153 of the embodiment includes an A/D converter which converts voltage input from the gap detector 152 to digital signals (detection signals), a computing unit which calculates a feedback voltage value based on differences between detection signals and target detection signals, and a D/A converter which converts the digital signals of the feedback voltage value of the calculated results to analog voltage and applies the voltage to the second electrostatic actuator 562. Moreover, similar to the first embodiment, based on the differences between the target detection signals input from the microcomputer 154 and the detection signals input from the feedback control portion 153, the feedback control portion 153 set and applies the feedback voltage with respect to the second electrostatic actuator 562 so that the differences are "0".

In this way, when the voltage is applied to the second electrostatic actuator 562 by the D/A converter of the feedback control portion 153, since an appropriate feedback voltage value is calculated by digital signal processing according to the change of the sensitivity of the second electrostatic actuator 562, the gain adjustment of the circuit is not needed, and a highly accurate feedback control can be performed by setting the voltage set by the D/A converter to a desired value. However, in the configuration in which the bias voltage is not applied to the bias driving portion 151, when the feedback control is performed by the bias driving portion 151, the sensitivity of the electrostatic actuator which applies the feedback voltage is increased according to the decrease of the amount of the interelectrode gap G2. Therefore, in order to perform a highly accurate feedback control, the feedback control portion 153 is needed to minutely divide the input voltage and apply the divided voltage to the second electrostatic actuator 562. That is, a D/A converter having a large bit number is used as the feedback control portion 153, and thus, the costs are increased.

On the other hand, in the embodiment, similar to the first embodiment, since the bias voltage is applied from the bias driving portion 151 to the first electrostatic actuator 561, compared to the case where the bias voltage is not applied, the sensitivity of the second electrostatic actuator 562 can be decreased. Thereby, as the feedback voltage which is set by the feedback control portion 153, compared to the case where the bias voltage is not applied, resolution of the voltage can be decreased. Therefore, in the feedback control portion 153, a D/A converter having a small bit number may be provided, and thus, the low costs of the feedback control portion 153 can be achieved.

Third Embodiment

In the first and second embodiments, examples are shown in which the fixed reflection film 54 and the movable reflection film 55 configure the first capacitance detection electrode and the second capacitance detection electrode according to the invention. On the other hand, a third embodiment is different from the first embodiment in that the electrodes which configure the first capacitance detection electrode and the second capacitance detection electrode are different from those of the first embodiment.

Figure 10:
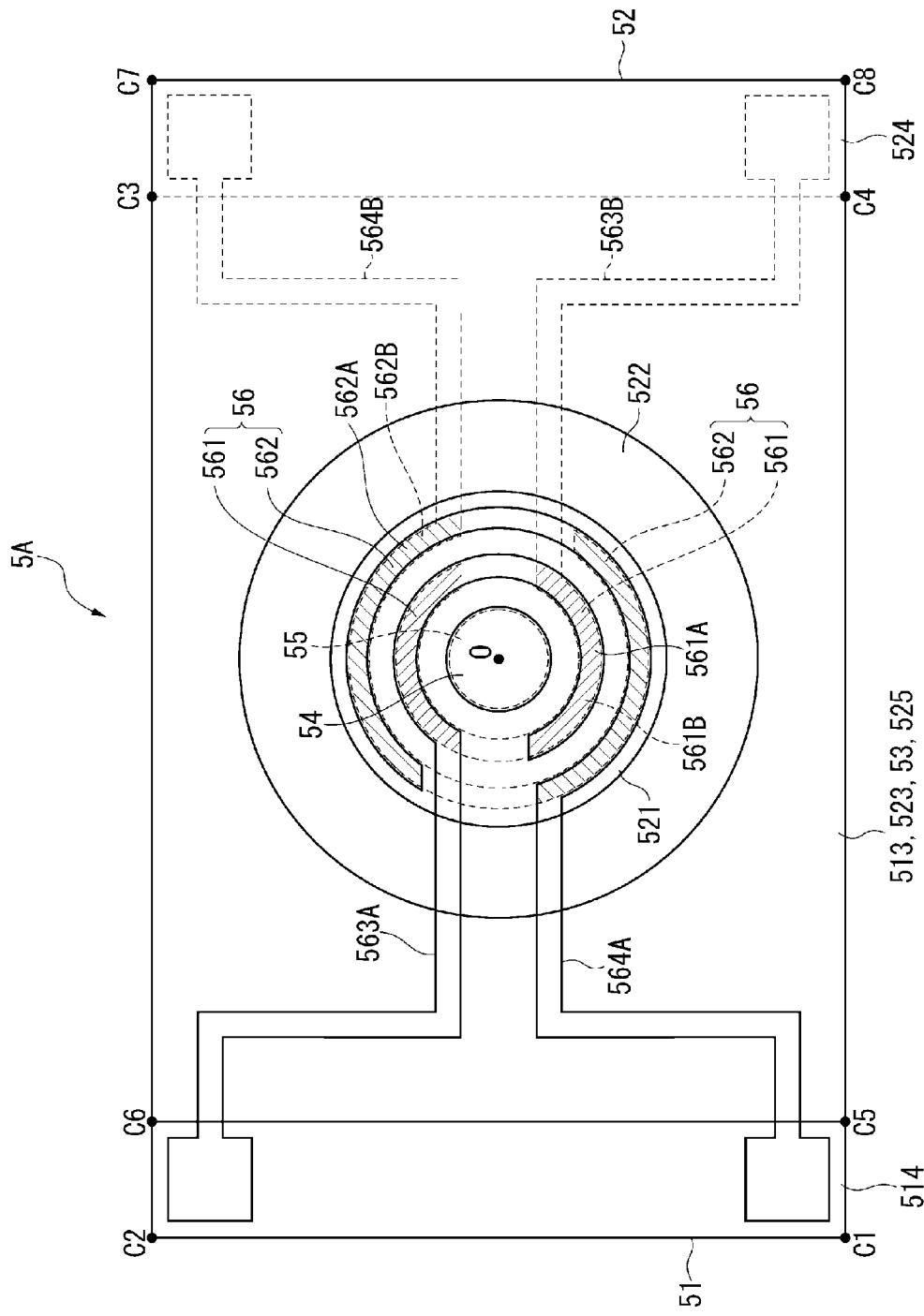
FIG. 10 is a plan view showing a schematic configuration of a wavelength variable interference filter according to a third embodiment.

FIG. 10 is a plan view showing a schematic configuration of a wavelength variable interference filter 5A in the third embodiment.

As shown in FIG. 10, in the wavelength variable interference filter 5A of the embodiment, the first electrode 561A and the second electrode 561B which configure the first electrostatic actuator 561 configure the first capacitance detection electrode and the second capacitance detection electrode according to the invention. In this case, the first lead-out electrode 563A and the second lead-out electrode 563B are connected to the bias driving portion 151 and the gap detector 152.

In the embodiment, the voltage signals for detecting the capacitance output from the gap detector 152 and the bias voltage output from the bias driving portion 151 are applied to the first electrostatic actuator 561. In this case, as the voltage signals for detecting the capacitance, signals, which become sufficient high frequencies of an extent that does not influence the driving of the electrostatic actuator portion 56, are preferably used. Moreover, in the gap detector 152, for example, two signals are separated using a coupling condenser or the like, and the voltage signals for detecting the capacitance are detected. Thereby, the influence to the gap change due to the voltage signals for detecting the capacitance can be prevented, and similar to the first embodiment, a highly accurate control of the amount of the gap G1 between the reflection films can be performed. Moreover, in the embodiment, since the fifth lead-out electrode 565A which is connected to the fixed reflection film 54 and the sixth lead-out electrode 565B which is connected to the movable reflection film 55 are not needed, the electrode configuration of the wavelength variable interference filter 5A can be simplified.

Moreover, in the example, the first electrode 561A and the second electrode 561B of the first electrostatic actuator 561 function as the first capacitance detection electrode and the second capacitance detection electrode according to the invention. However, the third electrode 562A and the fourth electrode 562B of the second electrostatic actuator 562 may function as the first capacitance detection electrode and the second capacitance detection electrode according to the invention. In this case, the third lead-out electrode 564A and the fourth lead-out electrode 564B may be connected to the gap detector 152 and the feedback control portion 153.

Other Embodiments

In addition, the invention is not limited to the above-described embodiments, and includes modifications, improvements, or the like within the scope capable of achieving an advantage of some aspects of the invention.

For example, as the first capacitance detection electrode and the second capacitance detection electrode according to the invention, the example in which the fixed reflection film 54 and the movable reflection film 55 are used in the first and second embodiments, and the example in which the first electrode 561A and the second electrode 561B of the first electrostatic actuator 561 or the third electrode 562A and the fourth electrode 562B of the second electrostatic actuator 562 are used in the third embodiment are shown. However, the invention is not limited to this.

Other electrodes which configure the first capacitance detection electrode and the second capacitance detection electrode according to the invention may be further provided on the fixed substrate 51 and the movable substrate 52. For example, a fifth electrode for detecting capacitance is provided between the fixed reflection film 54 and the third electrode 562A, a sixth electrode opposite to the fifth electrode is provided between the movable reflection film 55 and the fourth electrode 562B, and the capacitance between the fifth electrode and the sixth electrode may be detected.

Moreover, the gap detection unit is not limited to the configuration which uses the capacitance detection electrode described above. For example, a configuration may be adopted in which the amount of the gap G1 between reflection films is detected by detecting a curved state of the movable substrate 52 (holding portion 522) through a strain gauge or the like, and a configuration which provides a light sensor for detecting the gap amount in the outside may be adopted.

Moreover, in each embodiment, the bias voltage which is applied to the bias driving portion 151 is set based on Equation (1). However, the invention is not limited to this. For example, a configuration may be adopted in which the bias voltage with respect to the target gap amount of the gap G1 between the reflection films is stored as table data and stored in the storage unit. In this case, the microcomputer 154 does not perform the calculation of the bias voltage based on Equation (1) and may read the bias voltage with respect to the target gap amount from the table data.

Moreover, as the bias voltage, voltage may be used which drives only the bias driving portion 151 and is smaller than the drive voltage for setting the gap G1 between the reflection films to the target gap amount. Due to the fact that the bias voltage is applied, in the control of the second electrostatic actuator 562 by the feedback control portion 153, compared to the case where the bias voltage is not applied, the sensitivity can be decreased, and thus, accuracy of the feedback control can be improved.

Moreover, in each embodiment, the configuration is described in which the first electrostatic actuator 561 and the second electrostatic actuator 562 are provided as the electrostatic actuator portion 56, and the bias voltage is applied to the first electrostatic actuator 561 in order to perform the feedback control by the second electrostatic actuator 562 with high accuracy. On the other hand, a configuration in which the electrostatic actuator portion 56 includes a plurality of (three or more) electrostatic actuators may be adopted. For example, a configuration may be adopted in which the electrostatic actuator portion 56 includes an electrostatic actuator for control (second electrostatic actuator) for performing the feedback control, a first bias electrostatic actuator for decreasing the sensitivity of the electrostatic actuator for the feedback control, and a second bias electrostatic actuator which decreases the sensitivity of the first bias electrostatic actuator and improves the accuracy of the gap displacement.

That is, the first electrostatic actuator may be configured so as to be divided into at least two or more partial actuators (first bias electrostatic actuator and second bias electrostatic actuator in the example). Since the bias voltage which is applied to the first electrostatic actuator is controlled by the partial actuators, the bias voltage can be more accurately controlled, and thus, influence of the change of the drive voltage due to noise or the like can be effectively decreased.

Moreover, since the voltage resolution of the bias voltage can be decreased, the bit number of the bias driving portion 151 can be decreased, and lower costs can be achieved.

In each embodiment described above, the example is described in which the first electrostatic actuator 561 to which the bias voltage is applied is positioned at the outer circumference side of the second electrostatic actuator 562 to which the feedback voltage is applied. However, the invention is not limited to this. For example, in the outer circumference sides of the reflection films 54 and 55, the first electrostatic actuator 561 may be provided at the inner circumference side of the second electrostatic actuator 562 and the second electrostatic actuator 562 may be provided at the outer circumference side of the first electrostatic actuator 561.

Moreover, in each embodiment, the spectroscopic measurement device 1 is exemplified as the electronic device according to the invention. However, additionally, the driving method of the wavelength variable interference filter, the optical module, and the electronic device according to the invention may be applied to various fields.

Figure 11:
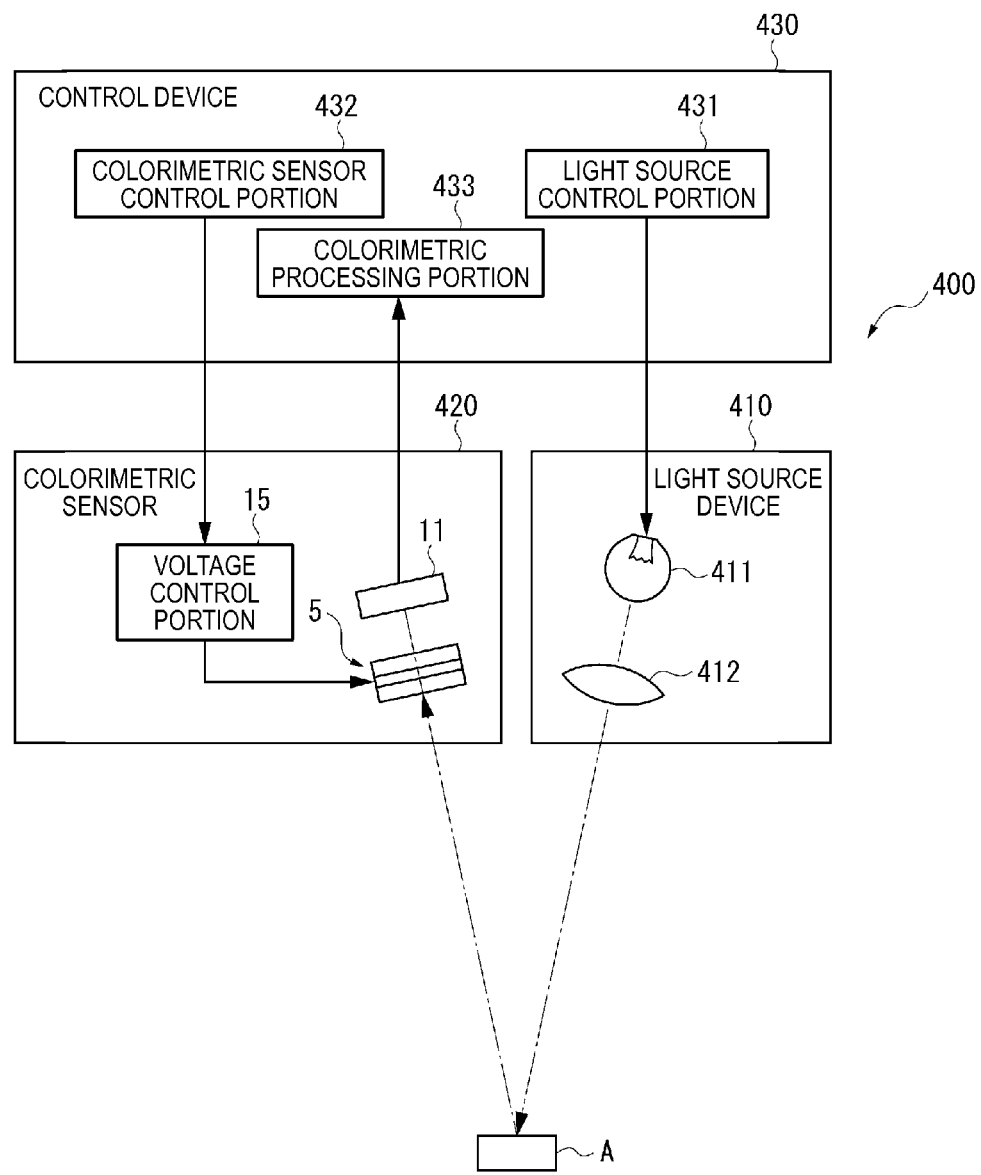
FIG. 11 is a schematic view showing a colorimetry device which is an example of an electronic device of the invention.

For example, as shown in FIG. 11, an electronic device according to the invention may be also applied to a colorimetry device for measuring color.

FIG. 11 is a block diagram showing an example of a colorimetry device 400 which includes a wavelength variable interference filter.

As shown in FIG. 11, the colorimetry device 400 includes a light source device 410 which emits light to an object to be inspected A, a colorimetric sensor 420 (optical module), and a control device 430 (processing portion) which controls the entire operation of the colorimetry device 400. Moreover, in the colorimetry device 400, the light emitted from the light source device 410 is reflected at the object to be inspected A, the colorimetric sensor 420 receives the reflected light to be inspected, and chromaticity of the light to be inspected, that is, the color of the object to be inspected A is analyzed and measured based on the detection signals which are output from the colorimetric sensor 420.

The light source device 410 includes a light source 411 and a plurality of lenses 412 (only one is shown in FIG. 11), and emits reference light (for example, white light) to the object to be inspected A, for example. Moreover, a collimator lens maybe included in the plurality of lenses 412, and in this case, in the light source device 410, the collimator lens makes the reference light emitted from the light source 411 be parallel light, and the parallel light is emitted toward the object to be inspected A from a projection lens (not shown). Moreover, in the embodiment, the colorimetry device 400 which includes the light source device 410 is exemplified. However, when the object to be inspected A is a light-emitting member such as a liquid crystal panel, a configuration in which the light source device 400 is not provided may be adopted.

As shown in FIG. 11, the colorimetric sensor 420 includes the wavelength variable interference filter 5, the detector 11 which receives the light transmitting the wavelength variable interference filter 5, and the voltage control portion 15 which changes the wavelength of the light transmitting the wavelength variable interference filter 5. In addition, the colorimetric sensor 420 includes an incident optical lens (not shown), which guides the reflected light (light to be inspected) which is reflected by the object to be inspected A into the inner portion, at a position opposite to the wavelength variable interference filter 5. Moreover, in the colorimetric sensor 420, the wavelength variable interference filter 5 disperses the light having a predetermined wavelength in the light to be inspected incident from the incident optical lens, and the detector 11 receives the dispersed light. Moreover, instead of the wavelength variable interference filter 5, wavelength variable interference filters 5A, 5B, 5C, 5D, and 5E, and an optical filter device 600 may be disposed.

The control device 430 controls the entire operation of the colorimetry device 400.

For example, as the control device 430, a general-purpose personal computer, a personal digital assistant, a computer used only for colorimetry, or the like may be used. Moreover, as shown in FIG. 11, the control device 430 includes a light source control portion 431, a colorimetric sensor control portion 432, a colorimetric processing portion 433, or the like.

The light source control portion 431 is connected to the light source device 410, and for example, outputs predetermined control signals to the light source device 410 based on the setting input of a user and emits white light having predetermined brightness.

The colorimetric sensor control portion 432 is connected to the colorimetric sensor 420, and for example, sets the wavelength of the light which is received to the colorimetric sensor 420 based on the setting input of a user, and outputs control signals of an intent, which detects the received quantity of the light having the set wavelength, to the colorimetric sensor 420. Thereby, the voltage control portion 15 of the colorimetric sensor 420 applies voltage to the electrostatic actuator 56 based on the control signals, and drives the wavelength variable interference filter 5.

The colorimetric processing portion 433 analyzes the chromaticity of the object to be inspected A from the received light quantity which is detected by the detector 11.

In addition, as another example of the electronic device according to the invention, there is a light based system for detecting existence of a specific material. For example, as the system, a gas detection device may be exemplified such as a gas leak detector for vehicle which adopts a spectroscopic measurement method using the wavelength variable interference filter according to the invention and detects specific gas with high sensitivity or an optoacoustics rare-gas detector for expiration test.

An example of the gas detection device will be described with reference to the drawings.

Figure 12:
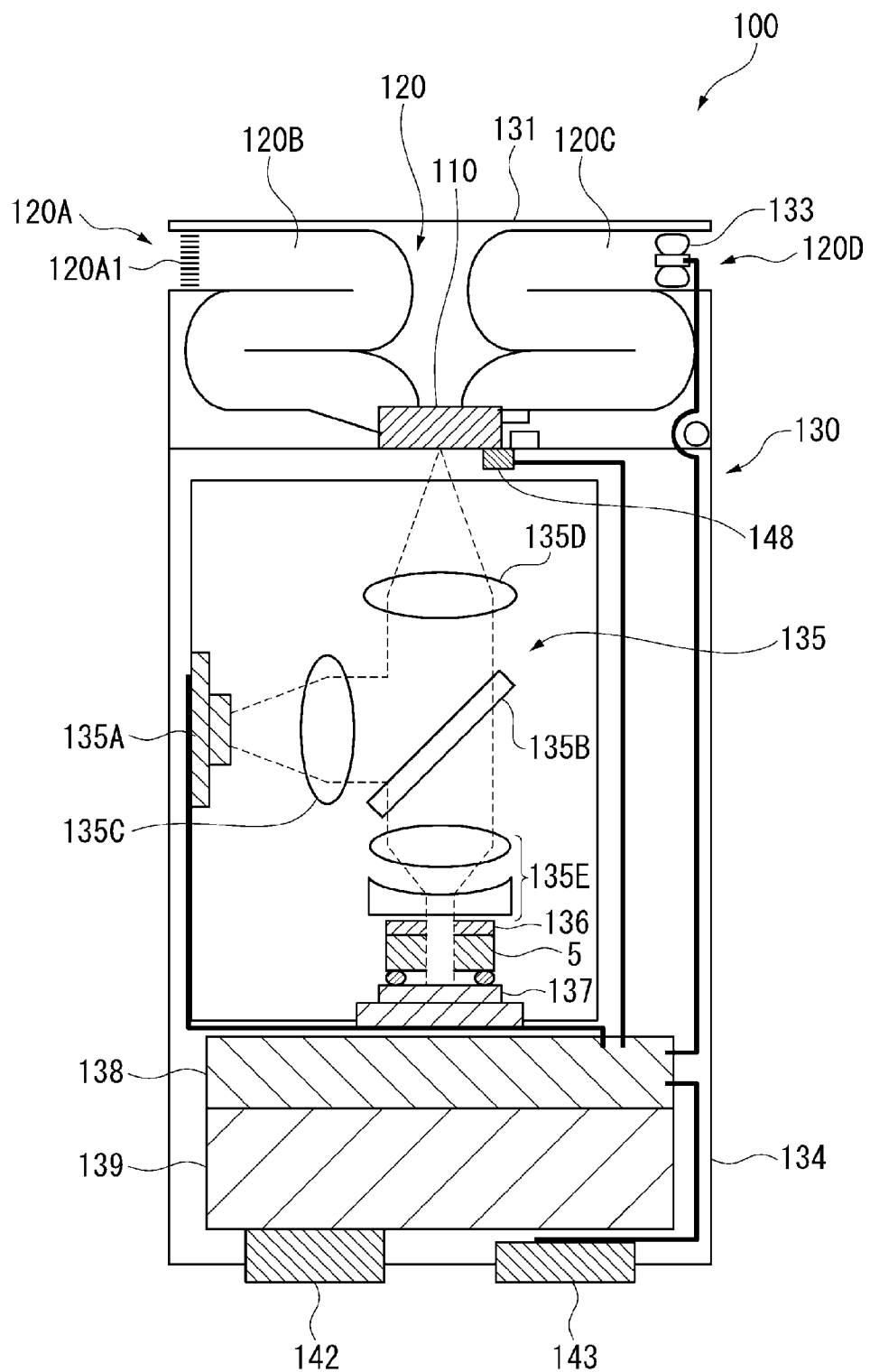
FIG. 12 is a schematic view showing a gas detection device which is an example of an electronic device of the invention.

FIG. 12 is a schematic view showing an example of the gas detection device which includes the wavelength variable interference filter.

Figure 13:
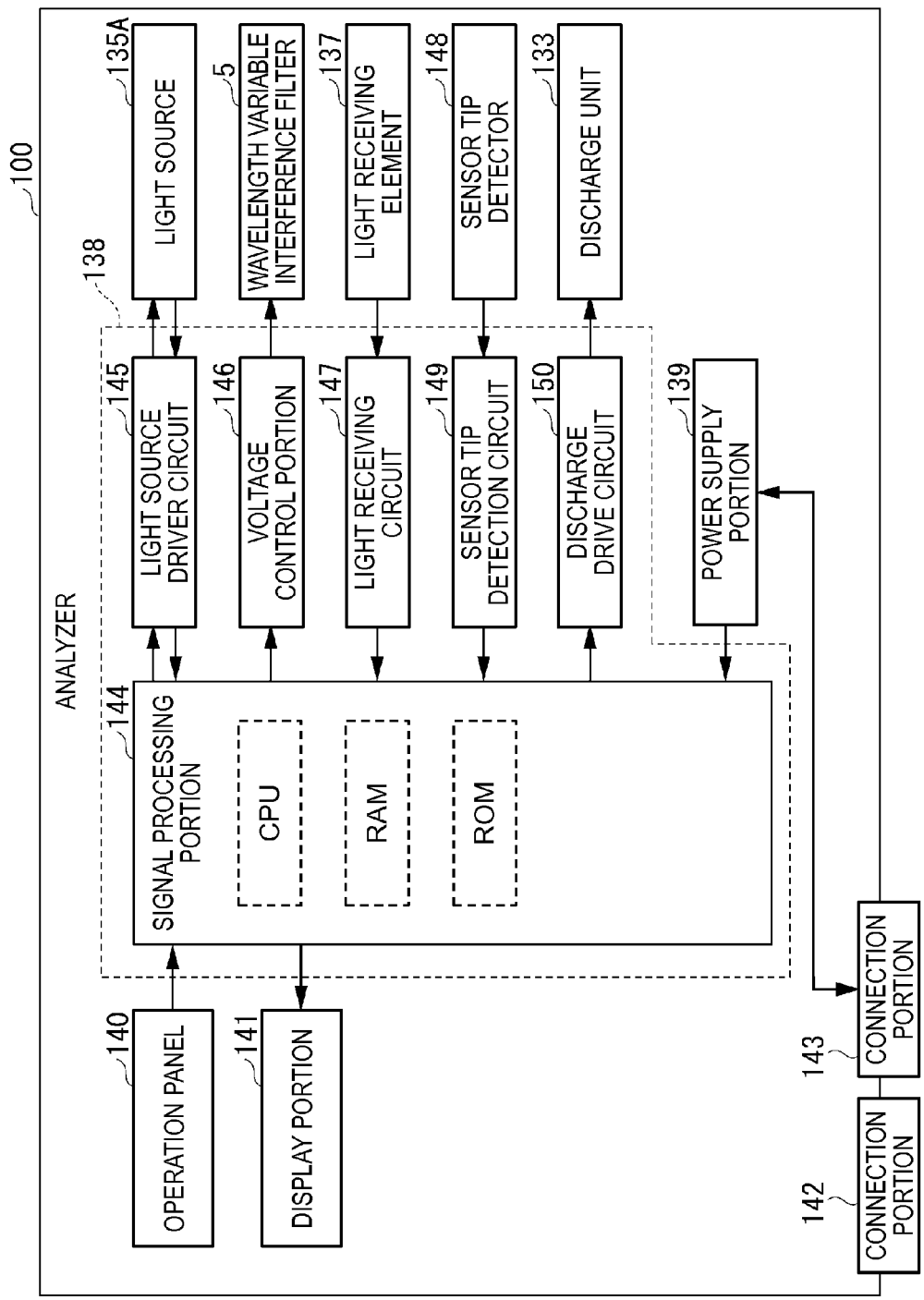
FIG. 13 is a block diagram showing a configuration of a control system of the gas detection device of FIG. 12.

FIG. 13 is a block diagram showing a configuration of a control system of the gas detection device of FIG. 12.

As shown in FIG. 12, the gas detection device 100 is configured so as to include a sensor tip 110, a channel 120 which includes a suction port 120A, a suction channel 120B, a discharge channel 120C, and a discharge port 120D, and a main body portion 130.

The main body portion 130 includes: a detection device (optical module) which includes a sensor portion cover 131 having an opening capable of attaching and detaching the channel 120, a discharge unit 133, a housing 134, an optical portion 135, a filter 136, the wavelength variable interference filter 5, a light receiving element (detection portion) 137, or the like; a control portion (processing portion) 138 which processes the detected signals and controls the detection portion; a power supply portion 139 which supplies an electric power, or the like. Moreover, the optical portion 135 includes a light source 135A which emits light, a beam splitter 135B which reflects the light incident from the light source 135A to the sensor tip 110 side and transmits the light incident from the sensor tip side to the light receiving element 137 side, and lenses 135C, 135D, and 135E.

Moreover, as shown in FIG. 13, an operation panel 140, a display portion 141, a connection portion 142 for interfacing with the outside, and the power supply portion 139 are provided on the surface of the gas detection device 100. When the power supply portion 139 is a secondary battery, a connection portion 143 for charging may be provided.

Moreover, as shown in FIG. 13, the control portion 138 of the gas detection device 100 includes: a signal processing portion 144 which includes a CPU or the like; a light source driver circuit 145 for controlling the light source 135A; a voltage control portion 146 for controlling the wavelength variable interference filter 5; a light receiving circuit 147 which receives the signals from the light receiving element 137; a sensor tip detection circuit 149 which receives signals from a sensor tip detector 148 reading a code of the sensor tip 110 and detecting presence or absence of the sensor tip 110; a discharge drive circuit 150 which controls the discharge unit 133, or the like.

Next, an operation of the above-described gas detection device 100 will be described below.

The sensor tip detector 148 is provided in the inner portion of the sensor portion cover 131 of the upper portion of the main body portion 130, and presence or absence of the sensor tip 110 is detected by the sensor tip detector 148. If the detection signals from the sensor tip detector 148 are detected, the signal processing portion 144 determines that it is a state where the sensor tip 110 is mounted, and issues display signals, which display intent capable of performing the detection operation, on the display portion 141.

Moreover, for example, if the operation panel 140 is operated by a user, and instruction signals of an intent, which starts the detection processing from the operation panel 140, are output to the signal processing portion 144, first, the signal processing portion 144 outputs operation signals of the light source to the light source driver circuit 145 and operates the light source 135A. If the light source 135A is driven, a stable laser light, which has a single wavelength and is linearly polarized light, is emitted from the light source 135A. Moreover, a temperature sensor or a light quantity sensor is built in the light source 135A, and the information is output to the signal processing portion 144. In addition, if the signal processing portion 144 determines that the light source 135A is stably operated based on the temperature or the light quantity input from the light source 135A, the signal processing portion controls the discharge drive circuit 150 and operates the discharge unit 133. Thereby, a gas sample which includes a target material to be detected (gas molecules) is introduced from the suction port 120A to the suction channel 120B, inside the sensor tip 110, the discharge channel 120C, and the discharge port 120D. Moreover, a dust filter 120A1 is provided in the suction port 120A, and thus, relatively large dust, some steam, and the like are removed.

Moreover, the sensor tip 110 is a sensor in which a plurality of metal nanostructures are assembled and which uses localized surface Plasmon resonance. In the sensor tip 110, a reinforced electric field is formed between metal nanostructures by the laser light, and if the gas molecules enter into the reinforced electric field, Raman scattered light and Reilly scattered light including the information of molecular vibration are generated.

Reilly scattered light or Raman scattered light are incident to the filter 136 through the optical portion 135, Reilly scattered light is separated by the filter 136, and Raman scattered light is incident to the wavelength variable interference filter 5. In addition, the signal processing portion 144 outputs control signals to the voltage control portion 146. Thereby, as described in the first embodiment, the voltage control portion 146 includes the bias driving portion 151, the gap detector 152, the feedback control portion 153, and the microcomputer 154, and according to the driving method similar to the first embodiment, the voltage control portion drives the wavelength variable interference filter 5 and disperses Raman scattered light corresponding to the gas molecules, which are the object to be detected, by the wavelength variable interference filter 5. Thereafter, if the light receiving element 137 receives the dispersed light, light receiving signals corresponding to the received light quantity are output to the signal processing portion 144 via the light receiving circuit 147. In this case, the intended Raman scattered light can be accurately extracted from the wavelength variable interference filter 5.

The signal processing portion 144 compares spectral data of Raman scattered light obtained as described above corresponding to the gas molecules which are the object to be detected and data which is stored in the ROM, determines whether or not the gas molecules are the objective gas molecules, and specifies the material. Moreover, the signal processing portion 144 displays the result information on the display portion 141 or outputs the information to the outside from the connection portion 142.

In addition, in FIGS. 12 and 13, the gas detection device 100 is exemplified in which Raman scattered light is dispersed by the wavelength variable interference filter 5 and the gas detection is performed by the dispersed Raman scattered light. However, as the gas detection device, a gas detection device, which specifies a gas kind by detecting absorbance inherent to gas, may be used. In this case, a gas sensor, which causes gas to flow into the inner portion of the sensor and detects light absorbed to the gas in the incident light, uses the optical module according to the invention. Moreover, a gas detection device, which analyzes and discriminates the gas flowed in the sensor by the gas sensor, may use the electronic device according to the invention. Also in this configuration, the component of the gas can be detected using the wavelength variable interference filter.

Moreover, the system for detecting the existence of the specific material is not limited to the above-described gas detection. For example, a material component analyzer may be exemplified such as a noninvasive measurement device of saccharide by a near-infrared spectrum, a noninvasive measurement device of information of food, living body, mineral, or the like.

Hereinafter, a food analyzer will be described as an example of the material component analyzer.

Figure 14:
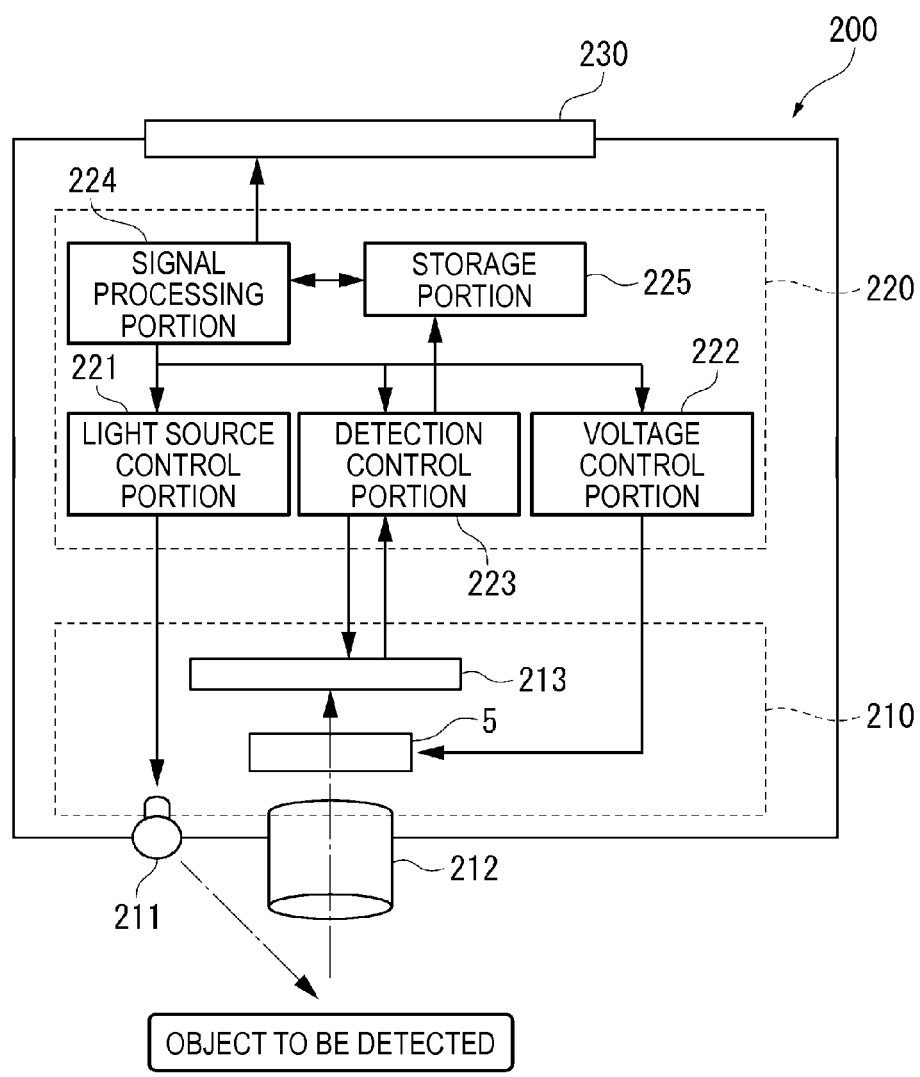
FIG. 14 is a view showing a schematic configuration of a food analyzer which is an example of an electronic device of the invention.

FIG. 14 is a view showing a schematic configuration of the food analyzer which is an example of an electronic device which uses the wavelength variable interference filter 5.

As shown in FIG. 14, the food analyzer 200 includes a detector 210 (optical module), a control portion 220, and a display portion 230. The detector 210 includes a light source 211 which emits light, an imaging lens 212 to which the light is introduced from an object to be measured, the wavelength variable interference filter 5 which disperses the light introduced from the imaging lens 212, and an imaging portion 213 (detection portion) which detects the dispersed light.

Moreover, the control portion 220 includes a light source control portion 221 which performs controls of lighting-on and lighting-off of the light source 211 and a control of brightness at the time of the lighting-on, a voltage control portion 222 which controls the wavelength variable interference filter 5, a detection control portion 223 which controls the imaging portion 213 and acquires spectroscopic images which is imaged by the imaging portion 213, a signal processing portion 224 (analyzing portion), and a storage portion 225.

In the food analyzer 200, if the system is driven, the light source 211 is controlled by the light source control portion 221, and light is radiated to the object to be measured from the light source 211. In addition, the light reflected by the object to be measured is incident to the wavelength variable interference filter 5 through the imaging lens 212. The wavelength variable interference filter 5 is driven by the control of the voltage control portion 222 according to the driving method described in the first embodiment. Thereby, the light of the target wavelength can be accurately extracted from the wavelength variable interference filter 5. Moreover, for example, the extracted light is imaged by the imaging portion 213 which includes a CCD camera or the like. In addition, the imaged light is accumulated in the storage portion 225 as a spectroscopic image. Moreover, the signal processing portion 224 changes the voltage value applied to the wavelength variable interference filter 5 by controlling the voltage control portion 222, and acquires the spectroscopic image with respect to each wavelength.

In addition, the signal processing portion 224 performs calculation processing with respect to data of each pixel in each image accumulated in the storage portion 225, and obtains the spectrum in each pixel. For example, in addition, information related to components of the food with respect to the spectrum is stored in the storage portion 225, and the signal processing portion 224 analyzes the data of the obtained spectrum based on the information related to the food stored in the storage portion 225, and obtains the food component which is included in the object to be detected and content thereof. Moreover, food calories, freshness, or the like may be also calculated from the obtained food component and the content. Moreover, by analyzing a spectrum distribution in the image, extraction or the like of a portion in which the freshness is decreased in the food of the object to be inspected can be performed, and detection of foreign matters or the like included in the food can be also performed.

Moreover, the signal processing portion 224 performs the processing which displays information such as the component, content, calorie, freshness, or the like of the food of the object to be inspected, which is obtained as described above, on the display portion 230.

In addition, FIG. 14 shows the example of the food analyzer 200. However, the similar configuration may be used in a noninvasive measurement device of information other than the above-described. For example, the configuration may be used in a living body analyzer which analyzes the living body component such as measurement or analysis of body fluid components of blood or the like. For example, in the living body analyzer, if a device for detecting ethyl alcohol is adopted as the device for measuring a body fluid component such as blood, the configuration may be used as an intoxicated driving preventive device for detecting a drinking state of a driver. Moreover, the configuration may be used for an electronic endoscope system which includes the living body analyzer.

In addition, the configuration may be used for mineral analyzer which performs a component analysis of mineral.

Moreover, the wavelength variable interference filter, the optical module, and the electronic device according to the invention may be also applied the following devices.

For example, data can be also transmitted by the light of each wavelength by changing the intensity of light of each wavelength over time, and in this case, the light of a specific wavelength is dispersed by the wavelength variable interference filter provided in the optical module, the data transmitted by the light of the specific wavelength can be extracted by receiving the light through a light receiving portion, the data of the light of each wavelength is processed by the electronic device having the optical module for extracting data, and thus, optical communication can be performed.

Moreover, the configuration may be also applied to a spectroscopic camera which images a spectroscopic image, a spectroscopic analyzer, or the like as the electronic device by dispersing light through the wavelength variable interference filter according to the invention. As an example of the spectroscopic camera, there is an infrared ray camera which the wavelength variable interference filter is built-in.

Figure 15:
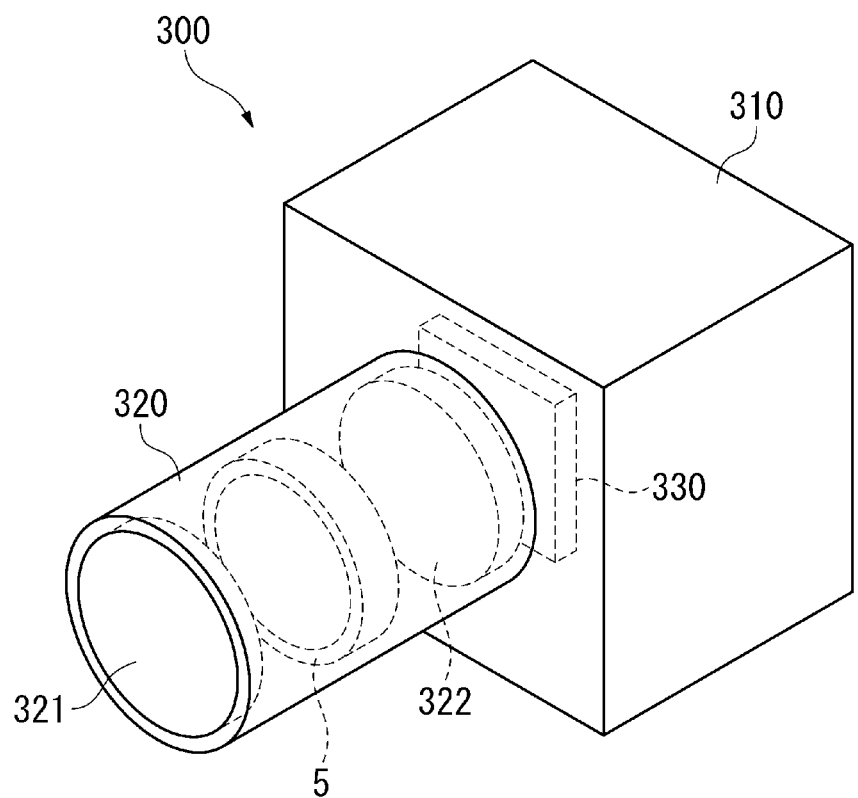
FIG. 15 is a view showing a schematic configuration of a spectroscopic camera which is an example of an electronic device of the invention.

FIG. 15 is a schematic view showing a schematic configuration of the spectroscopic camera. As shown in FIG. 15, the spectroscopic camera 300 includes a camera main body 310, an imaging lens unit 320, and an imaging portion 330 (detection portion).

The camera main body 310 is a portion which is grasped and operated by a user.

The imaging lens unit 320 is provided in the camera main body 310 and guides the incident image light to the imaging portion 330. Moreover, as shown in FIG. 15, the imaging lens unit 320 is configured so as to include an objective lens 321, an image forming lens 322, and the wavelength variable interference filter 5 which is provided between the lenses.

The imaging portion 330 includes a light receiving element and images the image light which is guided by the imaging lens unit 320.

In the spectroscopic camera 300, the light of the wavelength to be imaged is transmitted by the wavelength variable interference filter 5, and thus, the spectroscopic image of the light having a desired wavelength can be imaged. At this time, the voltage control portion (not shown) drives the wavelength variable interference filter 5 with respect to each wavelength according to the driving method according to the invention described in the first embodiment, and thus, the image light of the spectroscopic image of the target wavelength can be accurately extracted.

In addition, the wavelength variable interference filter according to the invention may be used as a band pass filter. For example, the wavelength variable interference filter may be also used in an optical laser device in which only narrow band light having a predetermined wavelength as the center in light of a predetermined wavelength region which is emitted by a light emitting element is dispersed by the wavelength variable interference filter and transmitted.

Moreover, the wavelength variable interference filter according to the invention may be also used as a living body authentication device, and for example, may be also applied to an authentication device of a blood vessel, a fingerprint, retina, iris, or the like using the light of a near-infrared region or a visible region.

Moreover, the optical module and the electronic device may be used as a concentration detection device. In this case, infrared energy (infrared light) which is emitted from a material is dispersed and analyzed by the wavelength variable interference filter, and the concentration of the material to be detected in the sample is measured.

As described above, the wavelength variable interference filter, the optical module, and the electronic device according to the invention may be also applied to any device which disperses a predetermined light from incident light. Moreover, as described above, since the wavelength variable interference filter according to the invention can disperse a plurality of wavelengths by one device, the measurement of the spectra of the plurality of wavelengths and the detection with respect to the plurality of components can be accurately performed. Therefore, compared to the device of the related art which extracts a desired wavelength by a plurality of devices, a decrease in the size of the optical module or the electronic device can be promoted, and for example, the wavelength variable interference filter may be appropriately used for a portable optical device or an optical device for vehicle.

In addition, the specific structure when the invention is embodied may be appropriately changed to other structures or the like within a scope capable of achieving an advantage of some aspects of the invention.

The entire disclosure of Japanese Patent Application No. 2012-112207 filed May 16, 2012 is hereby expressly incorporated by reference herein.

What is claimed is:

1. An optical module comprising:
a wavelength variable interference filter which includes two reflection films that are opposite to each other across a gap between the reflection films and an electrostatic actuator portion which changes an amount of the gap between the reflection films by applying a voltage; and
a voltage control portion which controls voltage which is applied to the electrostatic actuator portion,
wherein the electrostatic actuator portion includes a first electrostatic actuator and a second electrostatic actuator which can be driven independently of each other, and
the voltage control portion includes:
a bias voltage applying unit which applies bias voltage to the first electrostatic actuator;
a gap detection unit which detects the amount of the gap between the reflection films; and
a feedback voltage applying unit which applies feedback voltage corresponding to the gap amount which is detected by the gap detection unit to the second electrostatic actuator,
wherein a sensitivity of the second electrostatic actuator is controlled by applying the bias voltage to the first electrostatic actuator.

2. The optical module according to claim 1,
wherein the bias voltage applying unit applies bias voltage, in which the feedback voltage to set the gap between the reflection films to a predetermined gap amount becomes a predetermined voltage value, to the first electrostatic actuator.

3. The optical module according to claim 2,
wherein the wavelength variable interference filter includes:
a first substrate which is provided on one of the two reflection films; and
a second substrate which is provided so as to be opposite to the first substrate and provided on the other one of the two reflection films,
the first electrostatic actuator includes:
a first electrode which is provided on the first substrate; and
a second electrode which is provided on the second substrate and is opposite to the first electrode across a gap,
the second electrostatic actuator includes:
a third electrode which is provided on the first substrate; and
a fourth electrode which is provided on the second substrate and is opposite to the third electrode across a gap, and
when a spring coefficient of the second substrate is k, permittivity of the gap is $\epsilon$, an area of a region in which the first electrode and the second electrode are overlapped with each other in a plan view is $S_b$, an area of a region in which the third electrode and the fourth electrode are overlapped with each other in the plan view is $S_c$, an initial gap amount, which is the amount of the gap in a state where no voltage is applied to the first electro-static actuator and the second electrostatic actuator, is $d_{max}$, a displacement amount from the initial gap amount of the gap to extract light of a target wavelength by the wavelength variable interference filter is d, and sensitivity of the second electrostatic actuator to displace the gap by a predetermined amount is $R_c$,
the bias voltage applying unit applies a bias voltage $V_b$, which satisfies the following Equation (1), to the first electrostatic actuator $$V_b = \left[\frac{k}{\epsilon S_b}\left\{2d(d_{max}-d)^2 - \frac{kR_c^2(d_{max}-d)^2(d_{max}-3d)^2}{\epsilon S_c}\right\}\right]^{1/2}. \quad (1)$$

4. The optical module according to claim 1,
wherein the feedback voltage applying unit applies analog voltage to the second electrostatic actuator.

5. The optical module according to claim 1,
wherein the feedback voltage applying unit applies digital voltage to the second electrostatic actuator.

6. The optical module according to claim 1,
wherein the wavelength variable interference filter includes:
a first substrate which is provided on one of the two reflection films;
a second substrate which is provided so as to be opposite to the first substrate and provided on the other one of the two reflection films;
a first capacitance detection electrode which is provided on the first substrate; and
a second capacitance detection electrode which is provided on the second substrate and is opposite to the first capacitance detection electrode across a gap, and
the gap detection unit detects the amount of the gap between reflection films based on an electric charge which is held in the first capacitance detection electrode and the second capacitance detection electrode.

7. The optical module according to claim 6,
wherein the first capacitance detection electrode is one of the two reflection films, and the second capacitance detection electrode is the other one of the two reflection films.

8. The optical module according to claim 6,
wherein the second electrostatic actuator is positioned at a position further away from the first capacitance detection electrode and the second capacitance detection electrode than the first electrostatic actuator in a plan view.

9. The optical module according to claim 6,
wherein the first capacitance detection electrode and the second capacitance detection electrode are electrodes which configure at least one of the first electrostatic actuator and the second electrostatic actuator of the electrostatic actuator portion.

10. The optical module according to claim 1,
wherein the first electrostatic actuator includes at least two or more partial actuators which can be driven independently of each other.

11. An electronic device comprising:
a wavelength variable interference filter which includes two reflection films opposite to each other across a gap between the reflection films and an electrostatic actuator portion which changes an amount of the gap between the reflection films by applying a voltage; and
a voltage control portion which controls voltage which is applied to the electrostatic actuator portion, wherein the electrostatic actuator portion includes a first electrostatic actuator and a second electrostatic actuator, and the voltage control portion includes:
  a bias voltage applying unit which applies bias voltage to the first electrostatic actuator;
  a gap detection unit which detects the amount of the gap between the reflection films; and
  a feedback voltage applying unit which applies feedback voltage corresponding to the gap amount which is detected by the gap detection unit to the second electrostatic actuator, wherein a sensitivity of the second electrostatic actuator is controlled by applying the bias voltage to the first electrostatic actuator.

12. A food analyzer comprising:
a wavelength variable interference filter which includes two reflection films opposite to each other across a gap between the reflection films and an electrostatic actuator portion which changes an amount of the gap between the reflection films by applying a voltage;
a voltage control portion which controls voltage which is applied to the electrostatic actuator portion;
a detection portion which detects light extracted by the wavelength variable interference filter;
a storage portion which stores information related to a spectrum of a component of food; and
an analyzing portion which calculates a spectrum from the light detected by the detection portion and performs a component analysis of the food based on the information stored in the storage portion, wherein the voltage control portion includes:
  a bias voltage applying unit which applies bias voltage to the first electrostatic actuator;
  a gap detection unit which detects the amount of the gap between the reflection films; and
  a feedback voltage applying unit which applies feedback voltage corresponding to the gap amount which is detected by the gap detection unit to the second electrostatic actuator, wherein a sensitivity of the second electrostatic actuator is controlled by applying the bias voltage to the first electrostatic actuator.

13. A spectroscopic camera comprising:
a wavelength variable interference filter which includes two reflection films opposite to each other across a gap between the reflection films and an electrostatic actuator portion which changes an amount of the gap between the reflection films by applying a voltage;
a voltage control portion which controls voltage which is applied to the electrostatic actuator portion;
an imaging portion which images light transmitting the wavelength variable interference filter; and
a plurality of lenses which guide image light of an object to be measured to the imaging portion through the wavelength variable interference filter, wherein the voltage control portion includes:
  a bias voltage applying unit which applies bias voltage to the first electrostatic actuator;
  a gap detection unit which detects the amount of the gap between the reflection films; and
  a feedback voltage applying unit which applies feedback voltage corresponding to the gap amount which is detected by the gap detection unit to the second electrostatic actuator, wherein a sensitivity of the second electrostatic actuator is controlled by applying the bias voltage to the first electrostatic actuator.

14. A driving method of a wavelength variable interference filter which includes two reflection films opposite to each other across a gap between the reflection films and an electrostatic actuator portion which changes an amount of the gap between the reflection films by applying a voltage, in which the electrostatic actuator portion includes a first electrostatic actuator and a second electrostatic actuator, wherein the driving method of a wavelength variable interference filter includes:
  applying bias voltage to the first electrostatic actuator;
  detecting the amount of the gap between the reflection films; and
  applying feedback voltage corresponding to the gap amount which is detected by the detecting gap to the second electrostatic actuator, wherein a sensitivity of the second electrostatic actuator is controlled by applying the bias voltage to the first electrostatic actuator.

15. An optical module comprising:
a wavelength variable interference filter which includes a first reflection film, a second reflection film disposed so as to be opposite to the first reflection film, and an electrostatic actuator which changes a gap amount between the first reflection film and the second reflection film by applying a voltage; and
a voltage control portion which controls voltage which is applied to the electrostatic actuator, wherein the electrostatic actuator includes a first electrostatic actuator, a second electrostatic actuator which can be independently driven with respect to the first electrostatic actuator, and a gap amount detection portion which detects the gap amount, the voltage control portion applies bias voltage to the first electrostatic actuator and applies feedback voltage corresponding to the gap amount which is detected by the gap amount detection portion to the second electrostatic actuator, and a sensitivity of the second electrostatic actuator is controlled by applying the bias voltage to the first electrostatic actuator.

16. The optical module according to claim 15,
wherein the voltage control portion applies bias voltage, in which a displacement amount of the gap amount with respect to the feedback voltage applied to the second electrostatic actuator is linear, to the first electrostatic actuator.

* * * * *